United States Patent
Shao et al.

(10) Patent No.: US 11,628,421 B2
(45) Date of Patent: Apr. 18, 2023

(54) NONPRECIOUS METAL CATALYST FOR HYDROGEN PRODUCTION FROM NEUTRAL SOLUTIONS

(71) Applicant: Battelle Memorial Institute, Richland, WA (US)

(72) Inventors: Yuyan Shao, Richland, WA (US); Xiaohong Xie, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 675 days.

(21) Appl. No.: 16/653,487

(22) Filed: Oct. 15, 2019

(65) Prior Publication Data

US 2020/0346190 A1    Nov. 5, 2020

Related U.S. Application Data

(60) Provisional application No. 62/840,660, filed on Apr. 30, 2019.

(51) Int. Cl.
  *B01J 23/28* (2006.01)
  *B01J 37/08* (2006.01)
  *B01J 35/10* (2006.01)

(52) U.S. Cl.
  CPC ............ *B01J 23/28* (2013.01); *B01J 35/1066* (2013.01); *B01J 37/08* (2013.01)

(58) Field of Classification Search
  CPC ........ B01J 23/28; B01J 35/1066; B01J 37/08; Y02E 60/36; C25B 1/04; C25B 9/00; C25B 11/091
  USPC ........................................................ 502/211
  See application file for complete search history.

(56) References Cited

U.S. PATENT DOCUMENTS

2015/0167181 A1   6/2015   Vaden et al.
2018/0327918 A1  11/2018   Wang et al.

FOREIGN PATENT DOCUMENTS

CN          108620108 A        10/2018
KR       20150057238 A   *     5/2015
WO      WO 2019/098660 A2      5/2019

OTHER PUBLICATIONS

Alexander et al., "Alternative catalytic materials: carbides, nitrides, phosphides, and amorphous boron alloys," *Chem. Soc. Rev.*, 39:4388-4401, 2010.
Cui et al., "MoP nanosheets supported on biomass-derived carbon flake: One-step facile preparation and application as a novel high-active electrocatalyst toward hydrogen evolution reaction," *Appl Catal B Environ.* 164:144-150, 2015.
Gao et al., "General urea-assisted synthesis of carbon-coated metal phosphide nanoparticles for efficient hydrogen evolution electrocatalysis," *Electrochimica Acta.*, 199:99-107, 2016.
Kibsgaard et al., "Designing an improved transition metal phosphide catalyst for hydrogen evolution using experimental and theoretical trends," *Energ Environ Sci.*, 8(10):3022-3029, 2015.
Kibsgaard et al., "Molybdenum Phosphosulfide: An Active, Acid-Stable, Earth-Abundant Catalyst for the Hydrogen Evolution Reaction," *Angew Chem Int Ed.*, 53(52):14433-14437, 2014.

(Continued)

*Primary Examiner* — Taylor V Oh
(74) *Attorney, Agent, or Firm* — Klarquist Sparkman, LLP

(57) ABSTRACT

Catalysts comprising MoP and MoP$_2$ are disclosed, wherein the catalyst is a composite. The catalyst may have a molar ratio of MoP:MoP$_2$ within a range of 5:95 to 95:5. The catalyst may be used as a cathode active material for hydrogen generation from neutral pH solutions, such as wastewater or seawater. Methods of making the catalyst also are disclosed.

13 Claims, 12 Drawing Sheets

(56) References Cited

OTHER PUBLICATIONS

Oyama et al., "Transition metal phosphide hydroprocessing catalysts: A review," *Catal Today*, 143(1-2):94-107, 2009.

Pu et al., "Flexible molybdenum phosphide nanosheet array electrodes for hydrogen evolution reaction in a wide pH range," *Applied Catalysis B: Environmental*, 196:193-198, 2016.

Shi et al., "Recent advances in transition metal phosphide nanomaterials: synthesis and applications in hydrogen evolution reaction," *Chem Soc Rev.*;45:1 529-1541, 2016.

Vrubel et al., "Molybdenum Boride and Carbide Catalyze Hydrogen Evolution in both Acidic and Basic Solutions," *Angew. Chem. Int. Ed.*, 51:12703-12706, 2012.

Wang et al., "MoP nanoparticles with a P-rich outermost atomic layer embedded in N-doped porous carbon nanofibers: Self-supported electrodes for efficient hydrogen generation," *Nano Res.*, 11(9):4728-4734, 2018.

Wang et al., "Novel porous molybdenum tungsten phosphide hybrid nanosheets on carbon cloth for efficient hydrogen evolution," *Energy Environ Sci.*, 9(4):1468-1475, 2016.

Wu et al., "Three-dimensional porous structural $MoP_2$ nanoparticles as a novel and superior catalyst for electrochemical hydrogen evolution," *J of Power Sources*, 328:551-557, 2016.

Xiao et al., "Molybdenum phosphide as an efficient electrocatalyst for the hydrogen evolution reaction," *Energy Environ. Sci.*, 7:2624-2629, 2014.

Xing, et al., "Closely Interconnected Network of Molybdenum Phosphide Nanoparticles: A Highly Efficient Electrocatalyst for Generating Hydrogen from Water," *Adv. Mater.*, 26:5702-5707, 2014.

Deng et al., "Templated-Preparation of a Three-Dimensional Molybdenum Phosphide Sponge as a High Performance Electrode for Hydrogen Evolution," *J. Mater. Chem. A*, 2016, vol. 4, pp. 59-66.

International Search Report and Written Opinion for PCT/US2020/030095, dated Nov. 3, 2020, 6 pages.

Liu, "Novel Hybrid Microbial Electrochemical System for Efficient Hydrogen Generation from Biomass," Jun. 14, 2018, https://www.hydrogen energy.gov/pdfs/review 18/pd 129.

Xie et al., "Electrocatalytic Hydrogen Evolution in Neutral pH Solutions: Dual-Phase Synergy," *ACS Catalysis*, Aug. 8, 2019, vol. 9, pp. 8712-8718.

\* cited by examiner

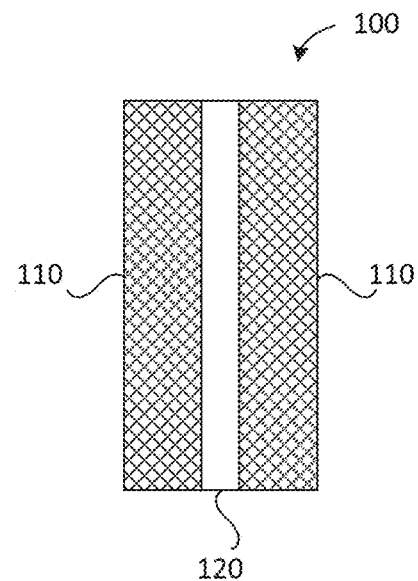
FIG. 1
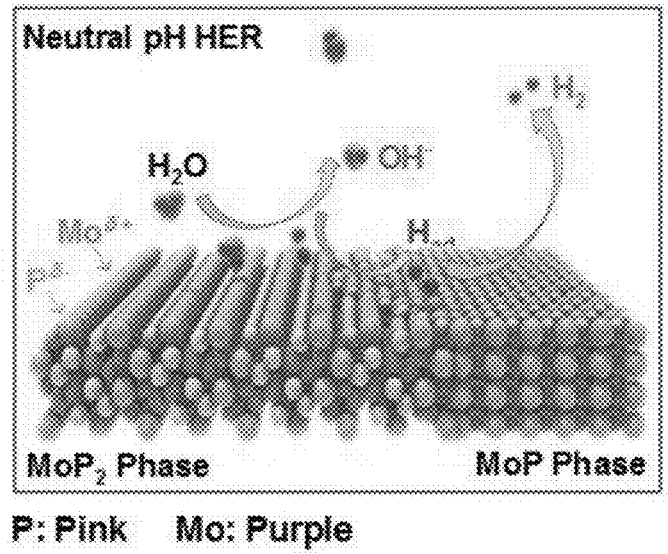
FIG. 3
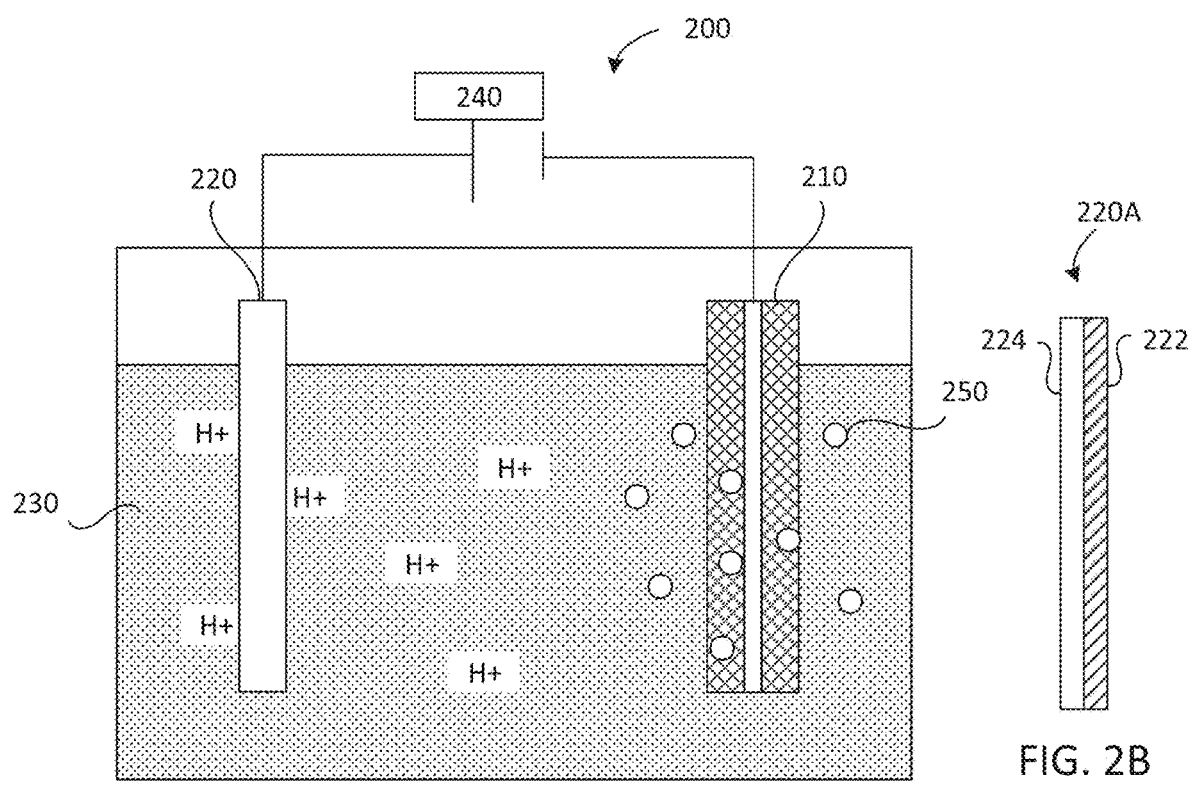
FIG. 2A
FIG. 2B

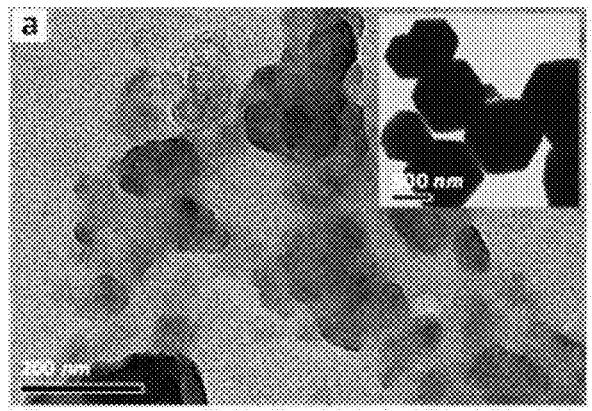
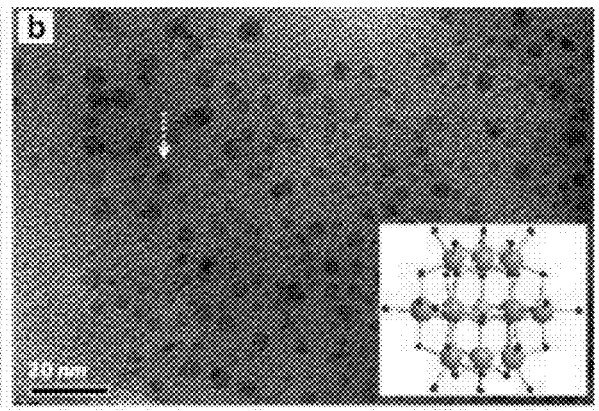
FIG. 4A    FIG. 4B
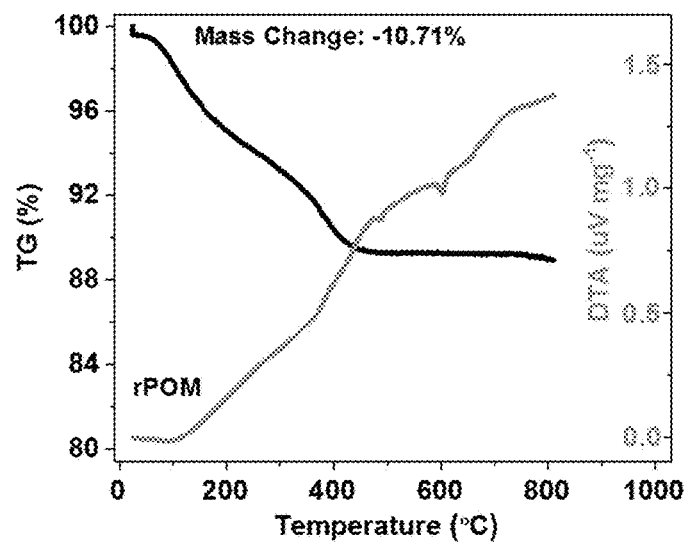
FIG. 5
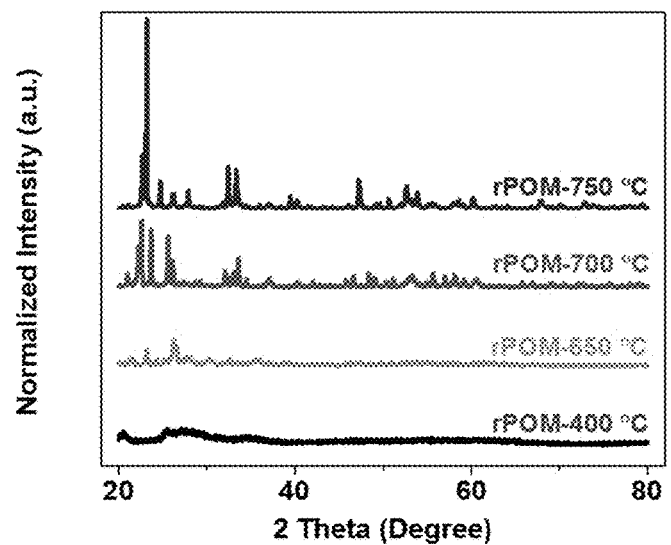
FIG. 6

FIG. 10A
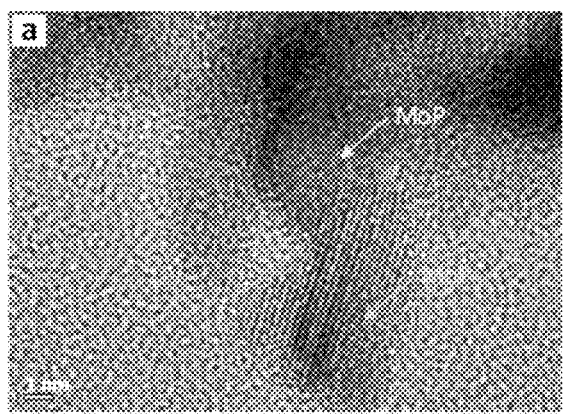
FIG. 10B
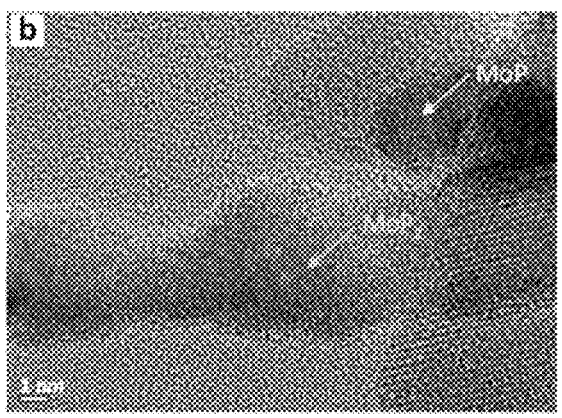
FIG. 10C
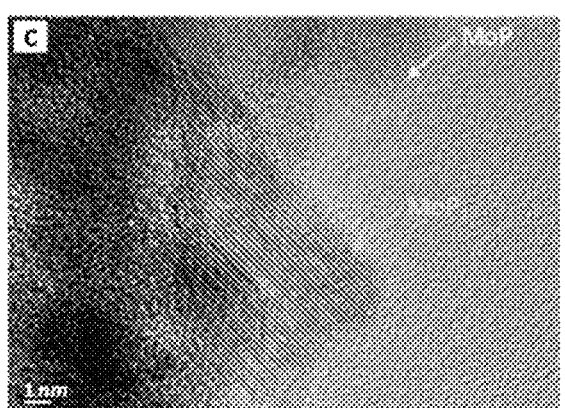
FIG. 10D
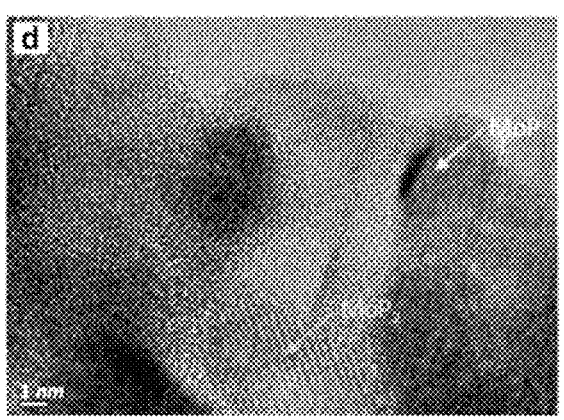
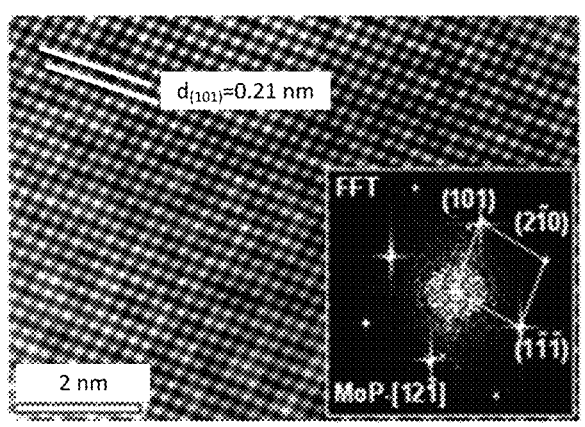
FIG. 11
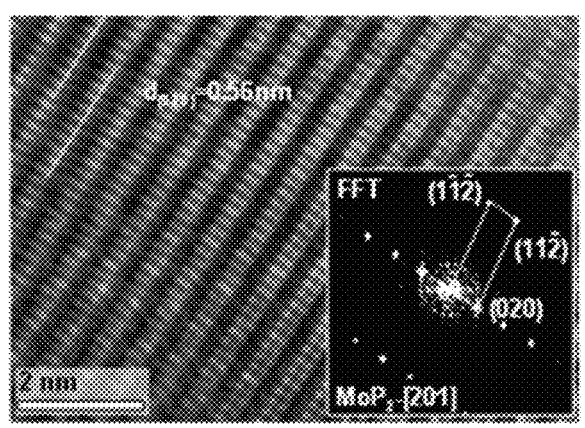
FIG. 12

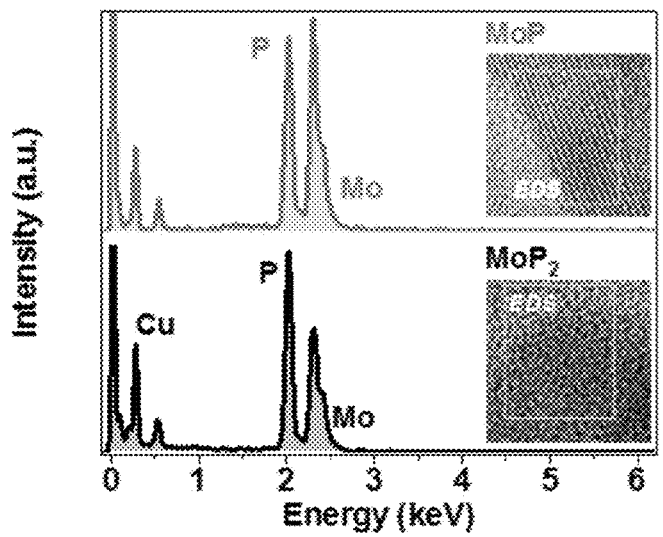
FIG. 13
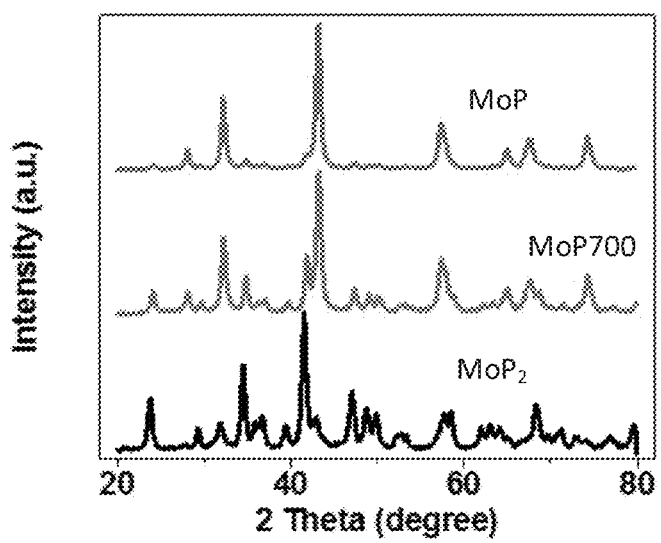
FIG. 14
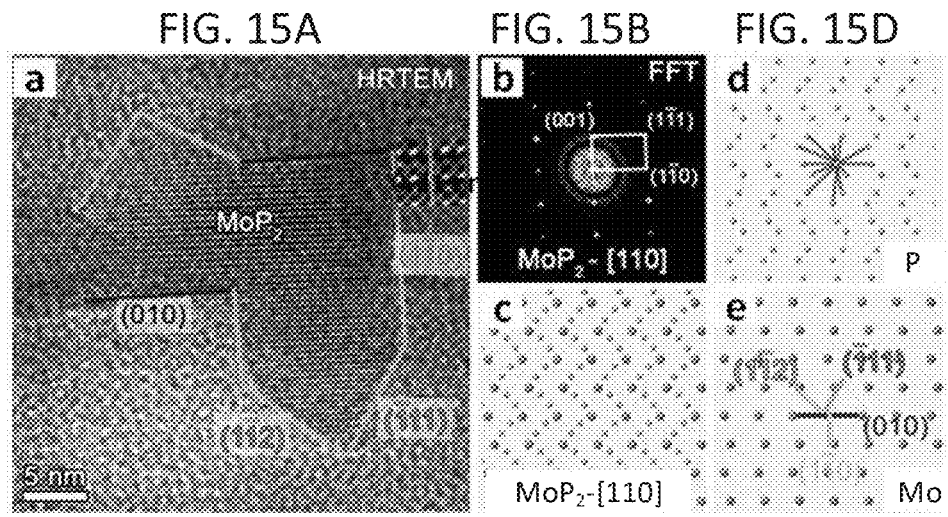
FIG. 15A   FIG. 15B   FIG. 15D
FIG. 15C   FIG. 15E

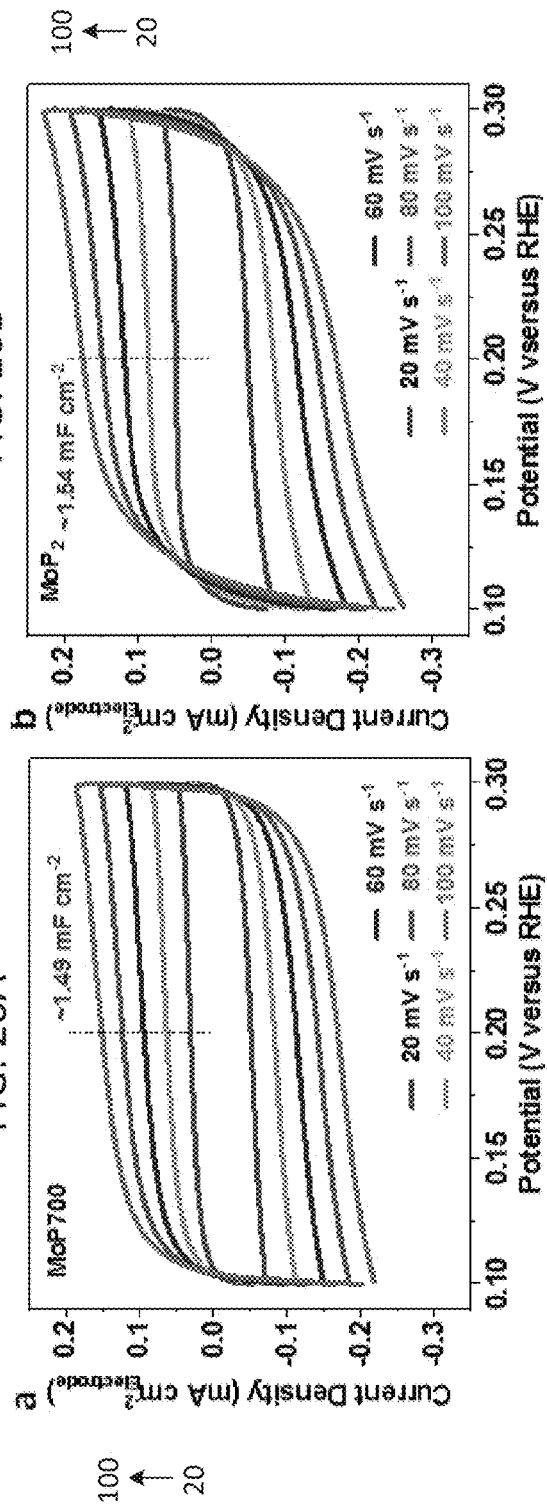
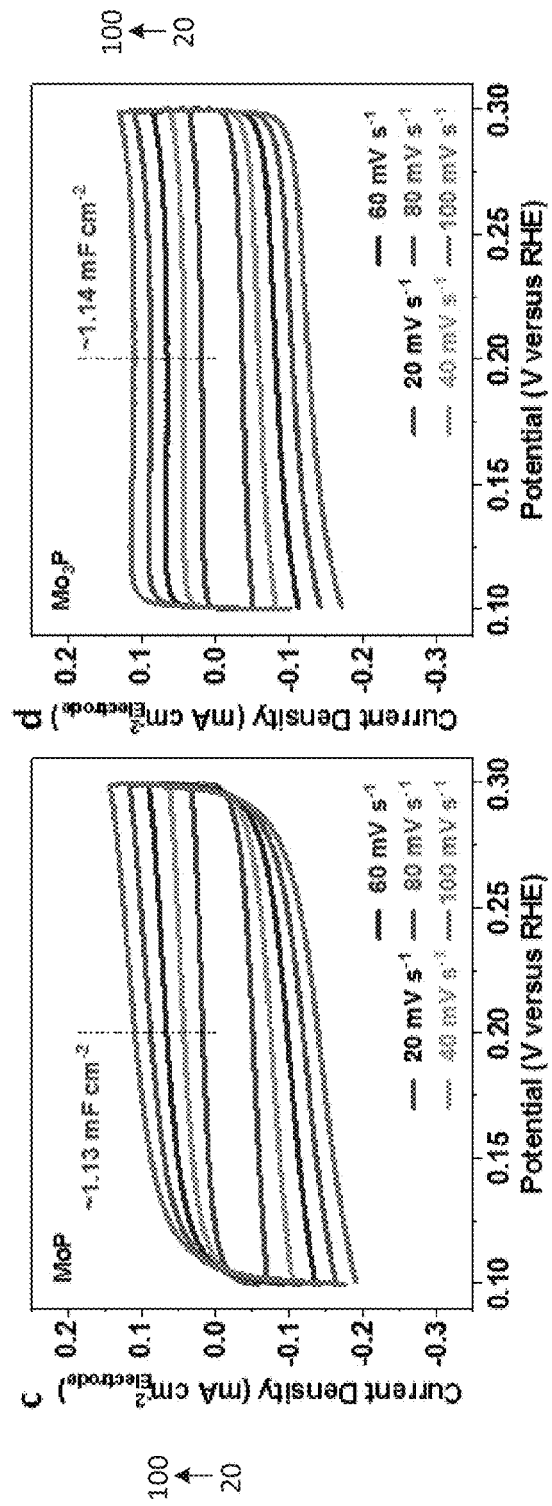
FIG. 26A  FIG. 26B  FIG. 26C  FIG. 26D

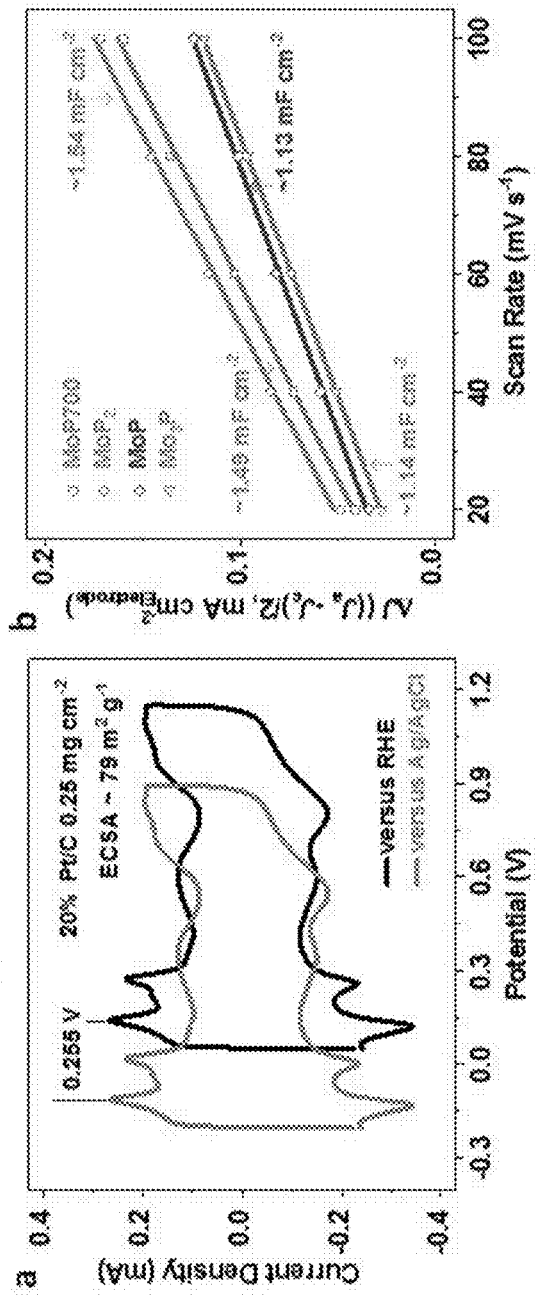
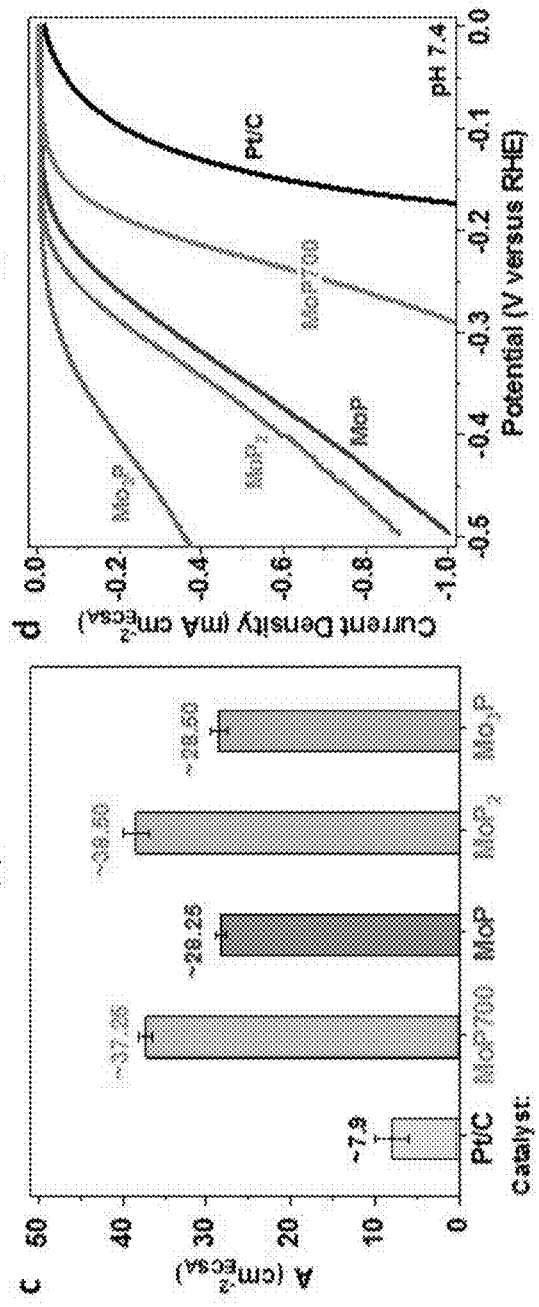
FIG. 27
FIG. 28
FIG. 29
FIG. 30

NONPRECIOUS METAL CATALYST FOR HYDROGEN PRODUCTION FROM NEUTRAL SOLUTIONS

CROSS REFERENCE TO RELATED APPLICATION

This application claims the benefit of the earlier filing date of U.S. Provisional Application No. 62/840,660, filed Apr. 30, 2019, which is incorporated by reference herein in its entirety.

ACKNOWLEDGMENT OF GOVERNMENT SUPPORT

This invention was made with Government support under Contract DE-AC05-76RL01830 awarded by the U.S. Department of Energy. The Government has certain rights in the invention.

FIELD

This disclosure concerns embodiments of a nonprecious metal catalyst, methods of using the catalyst for hydrogen production, and methods of making the catalyst.

SUMMARY

This disclosure concerns embodiments of a catalyst comprising MoP and $MoP_2$ and methods of making the catalyst. Cathodes comprising the catalyst and uses of the cathodes are also disclosed.

In some embodiments, a catalyst comprising MoP and $MoP_2$ has a molar ratio of MoP:$MoP_2$ within a range of 5:95 to 95:5. The catalyst may be a composite of MoP and $MoP_2$. In some embodiments, the catalyst is nanocomposite comprising nanoparticles having an average largest dimension within a range of 5-50 nm. In certain embodiments, the composite comprises regions of crystalline MoP and regions of $MoP_2$. In some examples, (i) the MoP regions comprise (101) planes and the $MoP_2$ regions comprise (020) planes, (ii) the MoP and $MoP_2$ regions may have Mo-terminated surfaces, or (iii) both (i) and (ii).

Embodiments of a method for making the disclosed catalysts include (i) combining (a) $M^+{}_n[PMo_{12}O_{40}]^{n-}$ where $3 \leq n \leq 27$ and M is a +1 cation (rPOM) and (b) $MH_2PO_2$ in a rPOM/$MH_2PO_2$ mass ratio within a range of 1:4 to 1:7 to provide a mixture; (ii) heating the mixture in an inert atmosphere at a first temperature $T_1$ within a range of 240° C. to 300° C. for a first period of time to form $MoP_x$ where $1 < x < 2$; and (iii) subsequently heating the $MoP_x$ in the inert atmosphere at a second temperature $T_2$ within a range of 675° C. to 725° C. for a second period of time to form a catalyst comprising MoP and $MoP_2$, the catalyst having a molar ratio of MoP:$MoP_2$ within a range of 5:95 to 95:5. In some embodiments, the method further includes preparing the rPOM by (i) preparing an aqueous solution comprising a phosphomolybdate (POM); (ii) adding a reducing agent to the aqueous solution with stirring; (iii) continuing to stir for an effective period of time to reduce POM and form a solution comprising $M^+{}_n[PMo_{12}O_{40}]^{n-}$ where $3 \leq n \leq 27$ and M is a +1 cation (rPOM); and (iv) drying the solution comprising rPOM nanoclusters to obtain rPOM. The starting material, POM, may be prepared by (i) preparing an aqueous solution comprising a molybdate and $H_3PO_4$ in a molar ratio $\leq 1:0.58$ with stirring; (ii) adding 10-15 mol $HNO_3$ per mol of the molybdate dropwise to the aqueous solution with stirring; (iii) incubating the aqueous solution at a temperature within a range of from 60° C. to 100° C. for at least two hours, thereby producing a solution comprising POM; and (iv) recovering POM from the solution comprising POM.

In some embodiments, a cathode comprises (i) an active material comprising a catalyst as disclosed herein and a binder, and (ii) a support, wherein the active material is disposed on the support. The cathode may be used in an electrolytic cell, including but not limited to seawater electrolysis cells (SECs) and microbial electrolysis cells (MECs). The electrolytic cell further includes an, an aqueous medium, and a voltage source. In some embodiments, the aqueous medium is wastewater or seawater. The electrolytic cell can be used to generate hydrogen from the aqueous medium by supplying a voltage to the cell, whereby hydrogen is generated. In some embodiments, the aqueous medium has a pH of 5-9. In some embodiments, the electrolytic cell is an MEC including an anode comprising a carbon support and a biofilm.

The foregoing and other objects, features, and advantages of the invention will become more apparent from the following detailed description, which proceeds with reference to the accompanying figures.

BRIEF DESCRIPTION OF THE DRAWINGS

FIG. 1 is a schematic cross-sectional view of a cathode comprising a MoP/$MoP_2$ catalyst.

FIG. 2A is a schematic cross-sectional view of an electrolysis cell.

FIG. 2B is a schematic cross-sectional view of an anode for a microbial electrolysis cell.

FIG. 3 is a schematic representation of the neutral pH hydrogen evolution reaction on the MoP/$MoP_2$ catalyst.

FIGS. 4A and 4B are, respectively, transmission electron microscopy (TEM) and high-resolution TEM (HRTEM) images of rPOM.

FIG. 5 shows thermogravimetric (TGA) curves of rPOM.

FIG. 6 shows X-ray diffraction (XRD) patterns for rPOM treated at different temperatures.

FIGS. 10A-10D are HRTEM images of MoP700.

FIG. 11 is an HRTEM image showing lattice fringes with interplane spacings of 0.21 nm corresponding to MoP (101) planes.

FIG. 12 is an HRTEM image showing d-spacings of 0.56 nm corresponding to $MoP_2$ (020) planes.

FIG. 13 shows qualitative energy dispersive X-ray spectroscopy (EDS) analysis of MoP700.

FIG. 14 shows XRD patterns for MoP, $MoP_2$, and MoP700.

FIGS. 15A-15E show further aspects of $MoP_2$ particles; 15A is a HRTEM image of a $MoP_2$ nanoparticle; 15B is an FFT image of the $MoP_2$ nanoparticle; 15C shows the simulated crystal structure along the [110] zone axis; 15D shows distribution of P atoms along the [110] zone axis; 15E shows distribution of Mo atoms along the [110] zone axis.

FIGS. 26A-26D show cyclic voltammograms (CV) curves of MoP700 (26A), MoP$_2$ (26B), MoP (26C) and Mo$_3$P (26D) in the potential region of 0.10-0.30 V (versus RHE) at various scan rates (20-100 mV s$^{-1}$).

FIG. 27 shows the calibration of Ag/AgCl (3.0M KCl) reference electrode with respect to reversible hydrogen potential using reversible hydrogen electrode (RHE) in H$_2$-saturated 0.5 M H$_2$SO$_4$.

FIG. 28 shows the measured C$_{dl}$ (FIGS. 26A-26D) plotted as a function of scan rate.

FIG. 29 shows calculated A$_{ESCA}$ values.

FIG. 30 shows the measured HER polarization curves normalized to A$_{ECSA}$ for Pt/C, MoP700, MoP, MoP$_2$, and Mo$_3$P.

DETAILED DESCRIPTION

Figure 7:
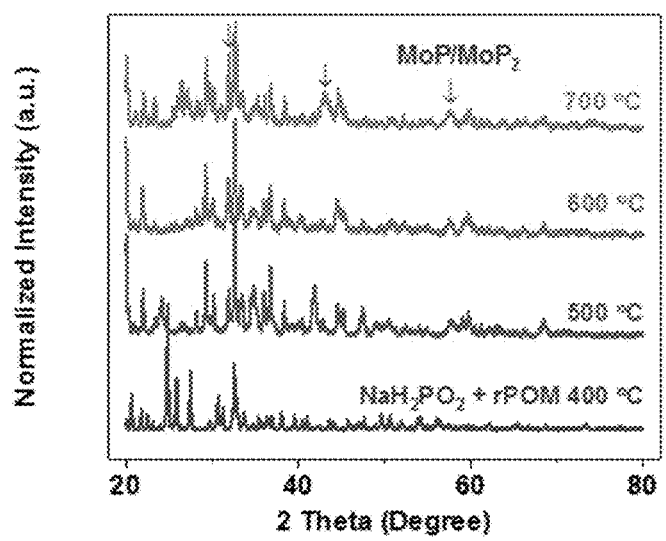
FIG. 7 shows XRD patterns for rPOM and $NaH_2PO_2$ mixtures treated at temperatures from 400 to 700° C.

Embodiments of a catalyst comprising MoP and MoP$_2$ are disclosed. In some embodiments, a cathode comprising the catalyst is used in an electrolytic cell to generate hydrogen. The electrolytic cell may be a microbial electrolysis cell (MEC) or a seawater electrolysis cell (SEC). In certain embodiments, the MEC is used to generate hydrogen from a neutral pH (e.g., pH 5-9) solution, such as wastewater.

I. DEFINITIONS AND ABBREVIATIONS

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Biofilm: An aggregate of microorganisms in which cells adhere to each other and/or to a surface. The cells may be embedded within an extracellular matrix of polymeric substances produced by the cells.

Biomass: Organic material obtained from living organisms, e.g., plants, animals, microorganisms.

Catalyst: A substance, usually present in small amounts relative to reactants, which increases the rate of a chemical reaction without itself being consumed or undergoing a chemical change. A catalyst also may enable a reaction to proceed under different conditions (e.g., at a lower temperature) than otherwise possible.

Cathode: An electrode through which electric charge flows out of a polarized electrical device during operation of the device. From an electrochemical point of view, positively charged cations invariably move toward the cathode and/or negatively charged anions move away from it to balance the electrons arriving from external circuitry.

Cell: As used herein, a cell refers to an electrochemical device used for generating a voltage or current from a chemical reaction, or the reverse in which a chemical reaction is induced by a current.

Composite: A solid material composed of two or more constituent materials having different physical and/or chemical characteristics that, when combined, produce a material in which each substance retains its identity while contributing desirable properties to the whole. By "retains its identity" is meant that the individual materials remain separate and distinct within the composite structure. A composite is not a solid solution or a simple physical mixture of the constituent materials. In other words, each particle of the composite includes regions or domains of the two or more constituent materials. As used here, the term nanocomposite refers to a composite comprising particles with an average largest dimension of no more than 100 nm.

Current density: A term referring to the amount of current per unit area. Current density is typically expressed in units of mA/cm$^2$.

Electrolyte: A substance containing free ions that behaves as an electrically conductive medium.

ECSA: Electrochemical active surface area.

Microbial electrolysis cell (MEC): An electrolytic cell including a cathode and an anode, wherein the anode comprises a biofilm. The electrolyte may be an aqueous solution capable of sustaining the microorganisms comprising the biofilm. An MEC for hydrogen production also may include an external power source. The applied voltage in combination with voltage produced by the microorganisms consuming an energy source in the electrolyte is sufficient to reduce protons in the electrolyte, producing hydrogen gas.

Nanocluster: A grouping or aggregate of nanoparticles.

Nanoparticle: A nanoscale particle with a size that is measured in nanometers, for example, a nanoscopic particle that has at least one dimension of ≤100 nm.

PGM: Platinum group metal—Ru, Rh, Pd, Os, Ir, Pt.

Polyoxometalate (POM): A self-assembled molecular cluster comprising oxoanions of a transition metal, such as molybdenum (VI). POMs also may include heteroatoms, e.g., P, As, Si, Ge. One exemplary molybdenum-based POM is ammonium phosphomolybdate—$(NH_4)_3PMo_{12}O_{40}$. The term rPOM refers to a reduced POM. One exemplary molybdenum-based rPOM is $Na^+_n[PMo_{12}O_{40}]^{n-}$ where the valence state on Mo is reduced from +6 to a value within a range of +4 to +6, and 3≤n≤27.

Region: As used herein, the term "region" refers to a measurable area or volume of a constituent within a composite material, such as a measurable area of the constituent on a transmission electron microscopy (TEM) or high-resolution TEM (HRTEM) image.

II. MoP/MoP$_2$ CATALYST

This disclosure concerns embodiments of a catalyst comprising MoP and MoP$_2$. The catalyst is not a physical mixture of MoP particles and MoP$_2$ particles. In some embodiments, the catalyst is a composite of MoP and MoP$_2$, such as a nanocomposite of MoP and MoP$_2$. In some embodiments, the composite is a nanocomposite comprising MoP/MoP$_2$ nanoparticles. In certain embodiments, the nanoparticles have an average largest dimension within a range of 5-50 nm, such as within a range of 5-40 nm or 5-30 nm.

The nanocomposite may include one or more regions or domains of MoP and one or more regions or domains of MoP$_2$. In some examples, individual domains may have an average largest dimension (e.g., when viewed with high-resolution transmission electron microscopy (HRTEM)) within a range of from 1 nm to 50 nm. In some embodiments, the regions of MoP and MoP$_2$ are crystalline. For instance, HRTEM images show lattice fringes with interplane spacings of 0.21 nm corresponding to MoP (101) planes and MoP$_2$ (020) planes with d-spacings of 0.56-0.58 nm (FIGS. 11, 12). In certain embodiments, the MoP and MoP$_2$ regions have Mo-terminated surfaces, i.e., the outermost atomic layer comprises Mo.

In any of the foregoing embodiments, the catalyst may have a molar ratio of MoP:MoP$_2$ within a range of 5:95 to 95:5. In some embodiments, the MoP:MoP$_2$ molar ratio is within a range of 10:90 to 90:10, 20:80 to 80:20, 30:70 to 70:30, 40:60 to 60:40, or 45:55 to 55:45.

III. METHODS OF MAKING THE MoP/MoP$_2$ CATALYST

Embodiments of the disclosed MoP/MoP$_2$ catalysts are made by reaction of a reduced polyoxometalate (rPOM) with a hypophosphite ($H_2PO_2^-$). In some embodiments, the rPOM is $M^+_n[PMo_{12}O_{40}]^{n-}$ where 3≤n≤27 and M is a +1 cation, and the hypophosphite is $MH_2PO_2$. In some embodiments, M is Na, K, or $NH_4^+$. In certain embodiments, M is Na. Without wishing to be bound by a particular theory of operation, rPOM is transformed into a composite of MoP and MoP$_2$ crystalline phases through a phase-controlled phosphidation process by $PH_3$/P, which is produced in situ by thermal decomposition of $H_2PO_2^-$.

The synthesis occurs in two steps. In a first step, the rPOM and $H_2PO_2^-$ are combined to form a mixture, and the mixture is heated in an inert atmosphere at a first temperature $T_1$ within a range of 240° C. to 300° C. for a first period of time to form MoP$_x$ where 1<x<2. In some embodiments, rPOM and $NaH_2PO_2$ are combined in an rPOM/$NaH_2PO_2$ mass ratio within a range of 1:4 to 1:7 to provide a mixture. A mass ratio outside of these ranges may result in formation of MoP$_2$ (e.g., at a ratio of 1:8.7) or Mo$_3$P (e.g., at a ratio of 1:1.50). In certain embodiments, the rPOM/$NaH_2PO_2$ mass ratio is within a range of from 1:5 to 1:6 or within a range of from 1:5.5 to 1:6. The first period of time is sufficient to form MoP$_x$. In some embodiments, the first period of time is at least one hour, such as from 1 to 3 hours. In one example, the first period of time was 2 hours.

In a second step, the MoP$_x$ is heated in the inert atmosphere at a second temperature $T_2$ within a range of 675° C. to 725° C. for a second period of time to form the catalyst comprising MoP and MoP$_2$, wherein a molar ratio of MoP:MoP$_2$ is within a range of 5:95 to 95:5, such as within a range of 10:90 to 90:10. In some embodiments, the second temperature $T_2$ is within a range of 680° C. to 720° C., or 690° C. to 710° C. In certain examples, the temperature $T_2$ was 700° C. Preferably the temperature is not greater than 725° C. A temperature of 750° C., for example, results in a loss of P and produces MoP only. In some embodiments, the second period of time is at least 4 hours, such as from 4 to 6 hours. In one example, the second period of time was 5 hours.

In any of the foregoing embodiments, the inert atmosphere may comprise argon, nitrogen, or helium. In some instances, the inert atmosphere is argon.

In some embodiments, the method further comprises preparing the rPOM from POM. One suitable POM is ammonium phosphomolybdate, e.g., $(NH_4)_3PMo_{12}O_{40}$ or a hydrate thereof, where Mo has a valence state of 6+. An aqueous solution comprising POM is prepared. A reducing agent is added to the aqueous solution with stirring, and stirring is continued for an effective period of time to reduce POM and form $M^+_n[PMo_{12}O_{40}]^{n-}$ where 3≤n≤27 and M is a +1 cation (rPOM). In rPOM, Mo has an average valence state of 4+≤Mo≤6+. In some embodiments, the effective period of time is at least one hour, such as from 1 to 3 hours. In one example, the effective period of time was 2 hours. In some embodiments, the reducing agent is $NaBH_4$. In such embodiments, M is Na. As reduction occurs, gas evolution is evident ($NH_4^+ + H^- \rightarrow NH_3 + H_2$), and a color change of the solution from clear to dark blue is observed. Following the reaction, the aqueous solution is dried to obtain rPOM. In some embodiments, the aqueous solution is first centrifuged to precipitate any impurities and provide a solution comprising rPOM nanoclusters. The solution is then separated from the precipitated impurities and dried to obtain rPOM. Drying may be performed by any suitable method. In some embodiments, the solution is lyophilized to obtain rPOM.

In any of the foregoing embodiments, the method may further comprise preparing POM. An aqueous solution comprising a molybdate and $H_3PO_4$ is prepared with stirring. In some embodiments, the molybdate is a heptamolybdate, such as ammonium molybdate tetrahydrate—$(NH_4)_6Mo_7O_{24} \cdot 4H_2O$. To ensure complete conversion of the molybdate to POM, the relative amounts of the starting material and $H_3PO_4$ may be selected to provide a Mo:P molar ratio$\leq$12:1, such as a Mo:P molar ratio$\leq$10:1 or $\leq$7:1. In some embodiments, the Mo:P molar ratio is within a range of 7:1 to 12:1. Accordingly, the molybdate and $H_3PO_4$ may be present in a molar ratio of $\leq$1:0.58, such as a molar ratio within a range of 1:0.58 to 1:1. In certain examples, the molar ratio is 1:0.6. Next, 10-15 mol $HNO_3$ per mol of the molybdate is added dropwise to the aqueous solution with stirring, and the aqueous solution is incubated at an effective temperature for a sufficient period of time to produce a solution comprising colloidal POM. In some embodiments, the colloidal POM is colloidal $(NH_4)_3PMo_{12}O_{40}$. The effective temperature may be within a range of from 60° C. to 100° C., or from 70° C. to 90° C. The period of time is at least two hours, such as from 2 to 6 hours. In some examples, the effective temperature is 80° C. and the sufficient period of time is 2 hours. The colloidal POM is recovered from the solution by any suitable method. For instance, the colloidal POM may be separated by centrifuging the solution and decanting the supernatant from the precipitated POM. In some embodiments, the POM is washed (e.g., with 1.0% $HNO_3$) and dried prior to use. In certain examples, the POM was dried at 80° C. for 24 hours.

IV. CATHODES AND CELLS COMPRISING THE CATHODES

Embodiments of the disclosed MoP/MoP$_2$ catalyst may be used as cathode active materials. In some embodiments, a cathode 100 comprises an active material 110 including a MoP/MoP$_2$ catalyst disposed on a support 120 (FIG. 1). The active material 110 may be coated on both sides of the support 120 as shown, or may be coated on just one side of the support.

In some embodiments, the active material 110 comprises the MoP/MoP$_2$ catalyst and a binder. One exemplary binder is a perfluorosulfonic acid (PFSA)/polytetrafluoroethylene (PTFE) copolymer. The catalyst may be mixed with a solution or suspension of the binder to form a catalyst suspension or paste, which is applied to the support 120 and dried. In some embodiments, the active material comprises at least 80 wt %, at least 90 wt %, at least 95 wt %, or at least 97 wt % catalyst. For example, the active material may comprise from 80-99.97 wt % catalyst, 90-99.97 wt % catalyst, or 95-99.97 wt % catalyst. The catalyst loading may be any desired amount that is practically feasible. In some embodiments, the catalyst loading is from 0.1-5 mg cm$^{-2}$, such as 0.2-3 mg cm$^{-2}$, 0.1-2 mg cm$^{-2}$, 0.1-1 mg cm$^{-2}$, 0.2-1 mg cm$^{-2}$, or 0.2-0.6 mg cm$^{-2}$. In certain embodiments, the active material consists essentially of, or consists of, the MoP/MoP$_2$ catalyst and the binder. As used herein, "consists essentially of" means that the active material does not include a measurable amount of additional components that participate in the generation of hydrogen from water; however, the active material may include trace amounts (e.g., $\leq$0.5 wt %) of inactive components other than the binder. Thus, in some examples, the active material includes $\leq$0.5 wt % amorphous carbon or an amorphous carbon precursor; the amorphous carbon may be porous. In one embodiment, the active material consists essentially of, or consists of, the MoP/MoP$_2$ catalyst and the PFSA/PTFE copolymer binder.

The support 120 may be any suitable conductive material. In some embodiments, the support 120 comprises carbon. Suitable carbon supports include, but are not limited to, carbon cloth, carbon paper, graphite felt, and the like.

In some embodiments, the cathodes are used in electrolysis cells for hydrogen production. An exemplary electrolytic cell 200 is shown in FIG. 2. The cell 200 comprises a cathode 210, an anode 220, an aqueous medium 230, and an external voltage source 240. The cell 200 may be a single-chamber cell as shown in FIG. 2A. Alternatively, the cell may be two-chamber cell with a separator placed between the anode and cathode (not shown).

The cathode 210 comprises an active material including a MoP/MoP$_2$ catalyst disposed on a support as discussed above. The anode 220 is an anode suitable for water electrolysis. Suitable anodes include, but are not limited to, anodes comprising metal oxides (e.g., oxides of Ir, Ru, Mn, Sn, Sb, Co, or combinations thereof), carbon-based anodes (e.g., graphite, carbon nanotubes, doped carbon, amorphous carbon), composite materials, or a biofilm disposed on a support.

In some embodiments, the electrolytic cell 200 is a microbial electrolysis cell (MEC), and the anode is an anode 220A comprising a biofilm 222 disposed on a support 224 (FIG. 2B). The biofilm comprises electrochemically active microorganism (e.g., bacteria) capable of oxidizing organic matter to generate $CO_2$, electrons, and protons. Such microorganisms may be referred to as exoelectrogens. Some non-limiting examples of exoelectrogens include *Geobacter metallireducens*, *Geobacter sulfurreducens*, *Clostridium acetobutylicum*, *Clostridium butyricum*, *Shewanella putrefaciens*, *Desfulfuromonas acetoxidans*, *Desulfovibrio desulfuricans*, *Thermincola potens*, *Thermincola, ferriacetica Rhodoferax ferrireducens*, *Aeromonas Hydrophilia*, *Pseudomonas aeruginosa*, *Desfulobulbus propionicus*, *Geopsychrobacter electrodiphilus*, *Geothrix fermentans*, *Shewanella oneidensis*, and *Escherichia coli*, among others. Typically the biofilm includes a plurality of bacterial species. The foregoing list is not all inclusive; nor is the order indicative of any preference or superiority of any particular species. In some embodiments, the cathode biofilm is produced using an inoculum from a suitable source, such as wastewater, seawater, a pond, a lake, or the like. In some embodiments, the support comprises carbon. Suitable carbon supports include, but are not limited to, carbon cloth, carbon paper, graphite felt, and the like.

The aqueous medium 230 may be a substantially neutral aqueous medium, such as an aqueous medium having a pH within a range of 5-9. In some embodiments, the pH is within a range of 5.5-8.5 or 6-8. In some embodiments, the aqueous medium comprises wastewater or seawater.

The electrolytic cell is maintained at a temperature and pressure suitable for water electrolysis. In some embodiments, the temperature is ambient temperature (e.g., 20-25° C.). In other embodiments, the temperature may within a range of 20-100° C. The pressure may be atmospheric pressure (e.g., ~1.01×10$^5$ Pa, 1 atm). However, in some embodiments, the pressure is from 0.9×10$^5$ to 5×10$^5$ Pa, such as from 0.9×10$^5$ to 3×10$^5$ Pa, or 1.5×10$^5$ to 2.5×10$^5$ Pa.

The electrolytic cell 200 includes an external voltage source 240 to supply energy for hydrogen production. In some embodiments, the external voltage source 240 supplies a voltage≥0.2 V, such as a voltage within a range of from 0.2-2 V, 0.2-1.5 V, 0.2-1 V, or 0.5-1 V.

When the electrolysis cell 200 is a MEC, the aqueous medium 230 is capable of sustaining the biofilm. The aqueous medium for the MEC includes nutrients and/or organic matter. Advantageously, the aqueous medium has a pH suitable for the biofilm such as a substantially neutral pH within a range of 5-9. In certain examples, the pH is within a range of 5.5-8.5 or 6-8. In some embodiments, the aqueous medium comprises wastewater (e.g., water comprising biomass). Alternatively, the aqueous medium may comprise seawater containing nutrients and/or organic matter capable of sustaining the biofilm. The MEC 200 may be maintained at a temperature and pressure suitable for the biofilm. In some embodiments, the temperature is ambient temperature (e.g., 20-25° C.). In other embodiments, the MEC may be heated, e.g., to a temperature within a range of 25-35° C. The pressure may be atmospheric pressure. However, in some embodiments, the pressure is from $0.9 \times 10^5$ to $5 \times 10^5$ Pa, such as from $0.9 \times 10^5$ to $3 \times 10^5$ Pa, or $1.5 \times 10^5$ to $2.5 \times 10^5$ Pa. In certain examples, an MEC was operated at ~$2 \times 10^5$ Pa (2 atm).

The MEC includes an external voltage source 240. Although some voltage may be generated by electrochemical activity of the biofilm, additional energy facilitates hydrogen production. In some embodiments, the external voltage source 240 supplies a voltage≥0.2 V, such as a voltage within a range of from 0.2-2 V, 0.2-1.5 V, 0.2-1 V, or 0.5-1 V.

Figure 24:
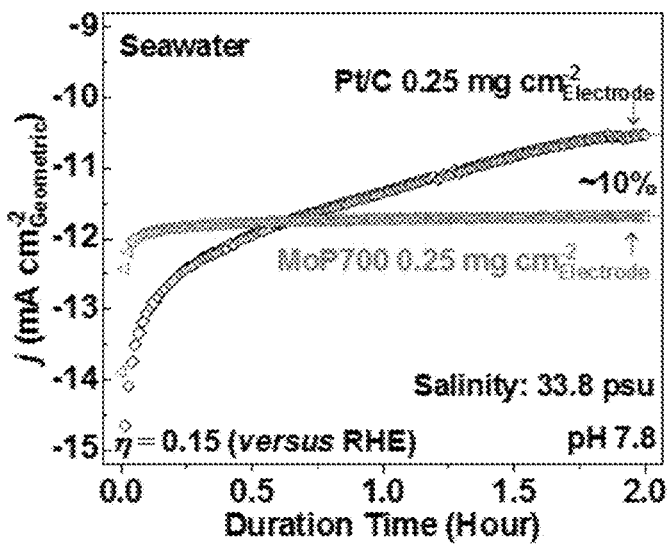
FIG. 24 shows HER on MoP700 and Pt/C catalysts in seawater (pH 7.8, salinity 33.8 psu, no iR-correction); scan rate: 5 mV·s$^{-1}$; electrode rotation rate: 1600 rpm.

In some embodiments, an electrolytic cell with a MoP/MoP$_2$ cathode produces a current density within a range of from 1-250 A·m$^{-2}$ (0.1-25 mA·cm$^{-2}$), such as a current density of 5-250 A·m$^{-2}$, 5-200 A·m$^{-2}$, 5-100 A·m$^{-2}$, or 5-50 A·m$^{-2}$. In one example with seawater (pH 7.8, salinity 33.8 psu), an electrolytic cell with a MoP/MoP$_2$ cathode (loading 0.25 mg·cm$^{-2}$) generated a current density of ~120 A·m$^{-2}$, which remained stable over 2 hours (FIG. 24).

V. HYDROGEN GENERATION

One efficient and sustainable route to generate hydrogen is catalytic hydrogen evolution reaction (HER) from water:

$$2H^+ + 2e^- \rightarrow H_2$$

Generating H$_2$ from mild neutral pH solutions (e.g., wastewater, seawater) has shown advantages of being environmentally friendly, sustainable, and/or cost-effective. It may also provide an efficient way for environmental cleanup. For example, H$_2$ production using a microbial electrolysis cell (MEC) cleans wastewater as organic materials in the wastewater are degraded by microorganisms.

Platinum-group-metals (PGM) are known to efficiently catalyze HER. However, practical application has been significantly limited by their scarcity and high cost. Some nonprecious metal HER catalysts are known, but most underperform in neutral pH solutions, making them unsuitable for use with wastewater or seawater.

Embodiments of the disclosed MoP/MoP$_2$ catalysts are useful HER catalysts. Advantageously, the catalysts may be used in an electrolysis cell to generate hydrogen from an aqueous medium, including neutral pH aqueous media, by HER.

In some embodiments, a method for generating hydrogen includes providing an electrolytic cell including a cathode comprising the MoP/MoP$_2$ catalyst and an anode suitable for water electrolysis. The aqueous medium may be a substantially neutral aqueous medium having a pH within a range of from 5 to 9. Embodiments of a method for generating hydrogen using an electrolysis cell include supplying a voltage to the electrolytic cell, whereby hydrogen is generated. In certain embodiments, the aqueous medium is seawater or wastewater. In some embodiments, the applied voltage is ≥0.2 V, such as a voltage within a range of from 0.2-5 V, 0.2-2.5 V, 0.5-2.5 V. The electrolytic cell may be operated under a temperature within a range of 20-100° C. and a pressure within a range of $0.9 \times 10^5$ Pa to $5 \times 10^5$ Pa.

In some embodiments, the electrolysis cell is an MEC including a cathode comprising the MoP/MoP$_2$ catalyst and an anode comprising a biofilm (e.g., as shown in FIG. 2). The aqueous medium may be a substantially neutral aqueous medium having a pH within a range of from 5 to 9. Embodiments of a method for generating hydrogen using an MEC include providing an MEC as disclosed herein, and supplying a voltage to the MEC, whereby hydrogen is generated. In one embodiment, the aqueous medium comprises wastewater. In an independent embodiment, the aqueous medium comprises seawater, wherein the seawater contains nutrients and/or organic matter capable of sustaining the biofilm. In some embodiments, the applied voltage is ≥0.2 V, such as a voltage within a range of from 0.2-1.5 V, 0.2-1 V, or 0.5-1 V. The MEC may be operated at a temperature within a range of 25-35° C. and a pressure within a range of $0.9 \times 10^5$ Pa to $5 \times 10^5$ Pa.

Figure 23:
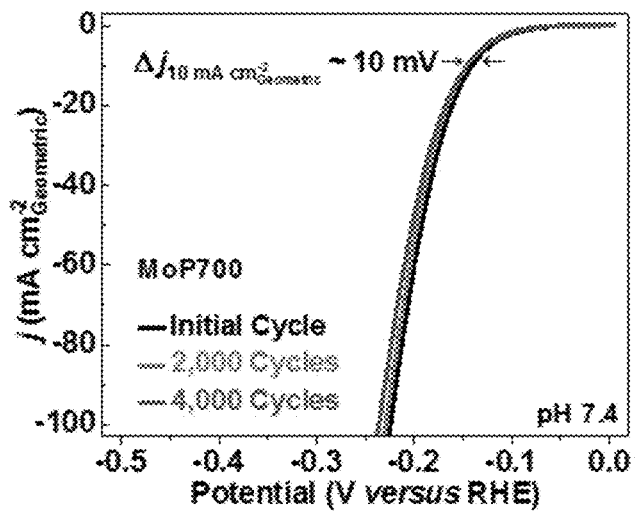
FIG. 23 shows the cycling stability of MoP700 over 4,000 cycles; all electrochemical data were obtained after cyclic-potential activation.

In some embodiments, a cathode comprising a MoP/MoP$_2$ catalyst as disclosed herein demonstrates outstanding stability with continuous hydrogen evolution for at least 4000 cycles in an accelerated stability test using a dynamic potential protocol (see Example 2, FIG. 23). Additionally, in some embodiments, an MEC including a cathode comprising MoP/MoP$_2$ exhibits an average current density≥50 A·m$^{-2}$, such as an average current density within a range of 50 A·m$^{-2}$ to 300 A·m$^{-2}$, 50 A·m$^{-2}$ to 200 A·m$^{-2}$, or 100 A·m$^{-2}$ to 200 A·m$^{-2}$. The current density is higher than that produced by a Pt/C catalyst, demonstrating that the MoP/MoP$_2$ catalyst is capable of generating H$_2$ at least 5 times faster than previously reported MECs (see Example 3, Table 2, FIG. 24). An MEC including a cathode comprising MoP/MoP$_2$ shows excellent stability with stable cycling for at least 8 hours, at least 12 hours, or at least 24 hours in 200 mM phosphate buffer (pH 7.0) with 75 mM sodium acetate (see Example 3, FIG. 25).

Without wishing to be bound by a particular theory of operation, the biofilm on the MEC anode oxidizes organic matter in the aqueous medium to generate CO$_2$, electrons, and protons. Meanwhile, H$_2$O adsorbs to the MoP/MoP$_2$ catalyst at the cathode and is decomposed, producing OH$^-$ and H$^+$, as shown in FIG. 3. H$_2$O decomposition preferentially occurs at the MoP$_2$ surface with a high contrast between the electrostatic affinity of "Mo$^{\delta+}$" to —OH and "P$^{\delta-}$" to —H to accelerate the H$_2$O dissociation. Adsorbed H$^+$ migrates to nearby MoP sites having optimum exposure 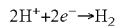 of Mo atoms to provide active sites for H$^+$ recombination to form H$_2$. The remaining OH$^-$ ions dissociate from the MoP$_2$ sites and combine with protons in the aqueous medium to form H$_2$O.

In some embodiments, the MoP/MoP$_2$ catalyst also provides superior results when producing hydrogen from seawater. Superior performance compared to a Pt/C catalyst with ~10% greater current density and excellent stability was demonstrated in a three-electrode cell using natural seawater (see Example 3, FIG. 24).

The composite nature of the MoP/MoP$_2$ catalyst has a synergistic effect with the catalytic activity being greater than MoP or MoP$_2$ individually and also greater than a simple physical mixture of MoP and MoP$_2$. In one example, a MoP/MoP$_2$ catalyst exhibited a η of 201 mV at j of 0.3 mA cm$^{-2}_{ESCA}$, which outperformed MoP$_2$, MoP and Mo$_3$P by 115, 89 and 261 mV (see Example 4, FIG. 30). A comparison of the HER catalytic activity showed that the MoP/MoP$_2$ catalyst greatly outperformed MoP or MoP$_2$ individually, and also greatly outperformed a physical mixture of MoP and MoP$_2$ (see Example 2, FIG. 19).

VI. EXAMPLES

General Methods

Characterization. Scanning and transmission electron microscopy (SEM and TEM) and high-resolution TEM images were obtained by a FEI Titan system. X-ray photoelectron spectroscopy (XPS) was obtained using a Kratos Axis Ultra DLD spectrometer. All peaks were adjusted based on C1s peak at 284.5 eV as a reference. X-ray diffraction patterns (XRD) were collected using a Philips Xpert X-ray diffractometer in a CuKα tube at λ=1.5418 Å.

Electrochemical Measurements. All electrochemical tests were performed in a three-electrode setup using a CHI 660D electrochemical workstation using an Ag/AgCl reference electrode (4.0 M KCl) and graphite-rod as counter electrode. The Ag/AgCl reference electrode was calibrated in H$_2$-saturated 0.5 M H$_2$SO$_4$ solution using Pt wire for both the working and counter electrodes to −0.255 V versus the reversible hydrogen electrode (RHE) ($E_{RHE}$=0.059 pH+0.255 V). To prepare the working electrode, 5 mg of catalyst was mixed with 3980 μL 70% water/isopropyl-alcohol and 20 μL of 5 wt % Nafion solution by sonication for 0.5 hour. Subsequently, 40 μL of the catalyst ink was drop-dried onto a glassy carbon (GC, Pine Instruments) to cover an area of 0.19625 cm$^2$ (~0.25 mg cm$^{-2}$). All the potentials reported in this work were converted to RHE. All the polarization curves were iR-corrected. AC impedance measurements were conducted in the same configuration when the working electrode was biased at overpotential of 100, 125 and 150 mV versus RHE from 10$^5$ Hz to 10$^{-1}$ Hz with an AC voltage of 5 mV. All the electrochemical data were obtained after electrochemical cyclic potential (CV) activation for 50 cycles (0 to 0.6 V versus RHE). All HER polarization curves were collected after electrochemical polarization potential activation for 3 scans (LSV, 0.15 to −0.45 V, versus RHE). CV between −0.45 and 0.15 V (versus RHE) at scan rate of 50 mV s$^{-1}$ for 4,000 cycles was performed to evaluate the HER stability. All tests were conducted 5 times to avoid any incidental error.

Density Functional Theory (DFT) Calculations. DFT calculations were performed by Vienna ab-initio simulation package (VASP) with the projector augmented wave pseudo-potentials to describe the interaction between atomic cores and valence electrons with DFT. The Perdew-Burke-Ernzerhof functional within the generalized gradient approximation (GGA) was used to implement DFT calculation. The MoP, MoP$_2$, Mo$_3$P (001) by the Mo-/P-terminated slab models were employed to simulate the surface properties. The reasonable vacuum layers were set to 15 Å in the z-direction for avoiding interaction between MoPx planes. A cutoff energy of 400 eV was provided and a 4×4×1 Monkhorst Pack k-point sampling was used for the well converged energy values. Geometry optimizations were pursued until the force on each atom falls below the convergence criterion of 0.02 eV Å-1 and energy was converged within 10-5 eV. The lowest two layers atoms were fixed while the other atoms were allowed to move during the geometry optimization in the Mo-/P-terminated surface. The differential adsorption energy of H atom can be estimated by using the equation:

$$\Delta E_{ad} = E_{ad/base} - E_{ad} - E_{base}$$

where $E_{ad/base}$, $E_{ad}$, and $E_{base}$ are the total energy of the adsorbed systems, the isolated H/H$_2$O, and base, respectively. The negative $\Delta E_{ad}$ demonstrates the energetically favorable interaction between adsorbate and slab surface.

Real Microbial Electrolysis Cell (MEC) Construction, Inoculation, and Operation. Single chamber MECs were used to compare the performance of MoP700 with Pt/C. The MECs were made from narrow mouth media bottles sealed with butyl septum topped caps. The total reactor volumes were 320 mL with a liquid volume of 100 mL and a gas volume of 220 mL. The MECs cathode with loadings of 0.5 mg cm$^{-2}$ MoP700 (or Pt/C) were fabricated as follows: (1) desired loading of catalyst was mixed with Nafion (5%) for 10 hours in a ratio of 7 μL mg$^{-1}$ of catalyst to form a paste; 2) the paste was uniformly pipetted to both sides of the cathode material; 3) the painted cathode was left to dry out at 25° C. for 1 day. The cathode had a projected surface area of 1 cm$^2$. The anode was plain carbon cloth (CC, Fuel Cell Earth) with a projected surface area of 10 cm$^2$. MEC was inoculated by scraping mature biofilm from a previously enriched MEC anode and applying the biofilm on the plain CC anode, and operated sequentially with a medium solution (pH~7.0) containing 200 mM phosphate buffer, 75 mM sodium acetate and necessary nutrients as reported previously (Liu et al., *Environ Sci Technol* 2004, 38(14):4040-6). The applied voltage across the electrodes was fixed at 1.0 V. Temperature was controlled at 32° C. Current was measured by recording the voltage across a serially connected 1Ω resistor using a multimeter with a data acquisition system (Type 2700, Keithley). Calculation of current density was performed as described previously (Cheng et al., *PNAS USA* 2007, 104(47):18871-3).

Example 1

Synthesis and Characterization of MoP/MoP$_2$ Catalyst

Synthesis of the MoP/MoP$_2$ catalyst involves two steps as discussed in detail below. In the first step, pristine POM was used to synthesize nanostructured rPOM through a reductive route. POMs are metal oxo clusters of group 5/6 elements that can accept or release electrons without destructing their nanostructures. In the second step, uniformly mixed rPOM and NaH$_2$PO$_2$ precursors (mass ratio of rPOM/NaH$_2$PO$_2$ is 1/5.8) are reacted to form a mixture of MoP/MoP$_2$ crystalline phases through a phosphidation process by PH$_3$/P which is produced by in situ thermal decomposition of NaH$_2$PO$_2$.

Synthesis of (NH$_4$)$_3$PMo$_{12}$O$_{40}$ (pristine POM). 0.01 mol (NH$_4$)$_6$Mo$_7$O$_{24}$.4H$_2$O (≥99%) and 0.006 mol H$_3$PO$_4$ (85%) were dissolved in 200 mL DI water (18.2 MΩ cm) under stirring. Then 8 mL of HNO$_3$ (70%) was dropwise added into the above mixture and kept at 80° C. for 2 hours. The resulting yellow-colored colloidal product was centrifuged and washed with 1.0% HNO$_3$ solution and dried at 80° C. for 24 hours.

Synthesis of rPOM (reduced POM). 5.0 g of POM was dispersed in 50 mL of DI water. Then 0.15 g of NaBH$_4$ (Sigma-Aldrich) was added to the above dispersion under stirring: as soon as the reduction of the POM occurred, gas evolution (NH$_4^+$+H$^-$→NH$_3$+H$_2$) took place and the solution color changed to dark-blue. After stirred for 2 hours to allow the complete reaction of the POM, rPOM nanoclusters-containing solution was centrifuged at a speed of 10,000 rpm for 2 hours to precipitate the impurities, and then, the resulting solution was separated and dried in a freezer-dryer to obtain the rPOM-Na$^+_n$[PMo$_{12}$O$_{40}$]$^{n-}$ where the valence state on Mo is reduced from +6 to a value within a range of +4 to +6, and 3≤n≤27.

The reduction method transformed bulky POM into discrete rPOM clusters of ~3-5 nm. FIG. 4A is a TEM image of rPOM; inset is a TEM image of (NH$_4$)$_3$PMo$_{12}$O$_{40}$. FIG. 4B is an HRTEM image of rPOM.

Synthesis of MoP700 Catalyst. 1.0 g of rPOM powder was mixed with 5.8 g of NaH$_2$PO$_2$.H$_2$O. The mixture was preheated at 240-300° C. for 2 hours (0.5° C. min$^{-1}$) in a tube furnace under Ar flow, and then calcined at 700° C. for 5 hours with Ar flowing, which transformed rPOM to a mixture of MoP/MoP$_2$ crystalline phases. The final product was ground and dispersed in 0.5 M HCl solution and kept at 80° C. for 1 hour, then centrifuged, washed with DI water and vacuum dried at 80° C. Advantages of this methodology include high reproducibility, avoidance of tedious purification procedures, and easy scale-up of up to gram quantities.

The formation of MoP is strongly associated with the high thermal stability of the rPOM nanocluster, in which the steric structure can only be decomposed into atomic Mo reactants at temperatures near 700° C. At lower temperatures, the nanocluster structure of rPOM can be maintained and the P or PH$_3$ species from the decomposition of NaH$_2$PO$_2$ (240-300° C.) could diffuse and then adsorb on the rPOM nanoclusters to form a solid composite consisting of rPOM encapsulated by P (rPOM@P). When the temperature is further increased to 700° C., the rPOM is decomposed and Mo and P atoms immediately combine to form MoP$_x$ ("MoP700"), a nanocomposite of MoP and Mo P$_2$.

Figure 8:
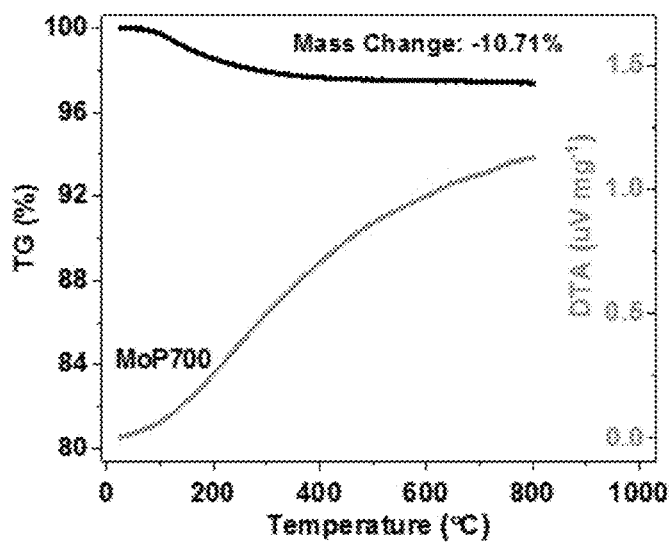
FIG. 8 shows TGA curves of one embodiment of a MoP/$MoP_2$ catalyst (MoP700) as disclosed herein.

FIG. 5 shows thermogravimetric (TGA) curves of rPOM. The sample had a 10.71% mass loss by ~480° C. due to the loss of crystal H$_2$O. There was very little mass loss from 400-700° C., confirming the rPOM precursor structure was stable. FIG. 6 shows XRD patterns for rPOM treated at different temperatures. FIG. 7 shows XRD patterns for a mixture of rPOM and NaH$_2$PO$_2$ treated at temperatures from 400 to 700° C. No MoP$_x$ phases were observed in products heated at temperatures below 700° C. When the reaction was heated at 700° C., enough energy was supplied to decompose the rPOM cluster, thereby promoting combination of Mo and P to form MoP$_x$. FIG. 8 shows TGA curves of MoP700.

For comparison, MoP$_2$, Mo$_3$P catalysts were also prepared by varying the mass ratio of Mo and P precursors, while MoP was obtained by heating the MoP700 catalyst in an Ar environment at 750° C. MoP$_2$ was prepared by combining 1.0 g rPOM powder with 8.69 g NaH$_2$PO$_2$.H$_2$O. Mo$_3$P was prepared by combining 1.0 g rPOM powder with just 1.50 g NaH$_2$PO$_2$.H$_2$O.

Figures 9A, 9B:
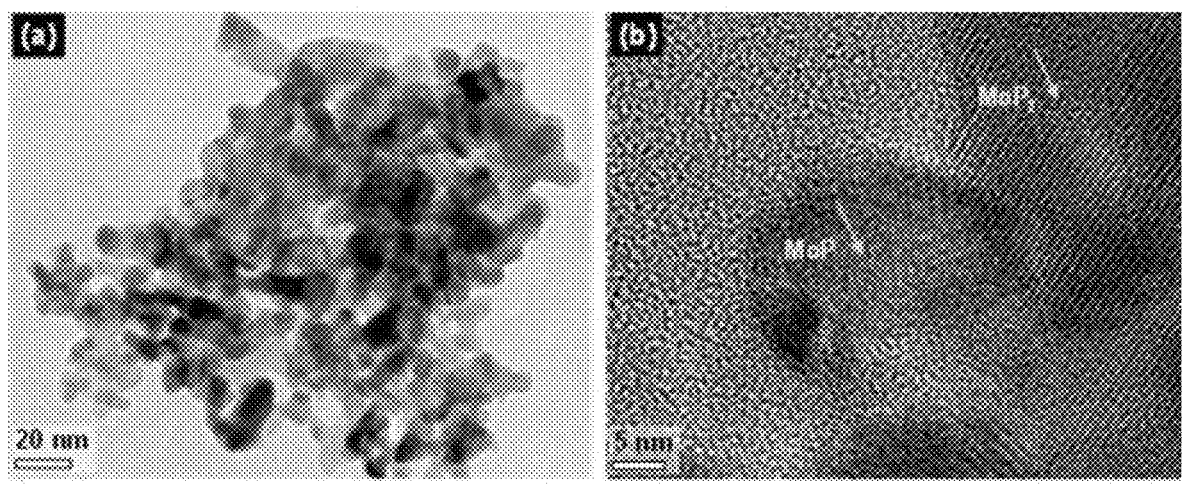
FIGS. 9A and 9B, respectively, are TEM and HRTEM images of MoP700.

FIG. 9A is a TEM image of the as-synthesized MoP700 with nanoparticle size in the range of 8-30 nm. High-resolution TEM (HRTEM) imaging further reveals a crystalline nature and a MoP$_2$/MoP heterostructure of MoP700 (FIGS. 9B, 10A-10D). The coexistence of MoP and MoP$_2$ domains are clearly seen in the as-synthesized catalyst. Imaged lattice fringes with interplane spacings of 0.21 nm correspond to MoP (101) planes (FIG. 11), and d-spacings of 0.56 nm correspond to MoP$_2$ (020) planes (FIG. 12). The crystal structure difference of MoP and MoP$_2$ is also clearly visible form their Fast Fourier Transforms (FFT) in FIGS. 11 and 12, respectively. Qualitative energy dispersive X-ray spectroscopy (EDS) analysis confirmed the elemental compositions of selected area of MoP and MoP$_2$, which are consistent with their chemical formulas, 47.5:52.5 (~1:1) and 36.8:63.2 (~1:2) for MoP and MoP$_2$, respectively (FIG. 13). XRD patterns of MoP, MoP$_2$ and MoP700 further confirms the co-existence of MoP and MoP$_2$ phases in MoP700 (FIG. 14).

Figure 16:
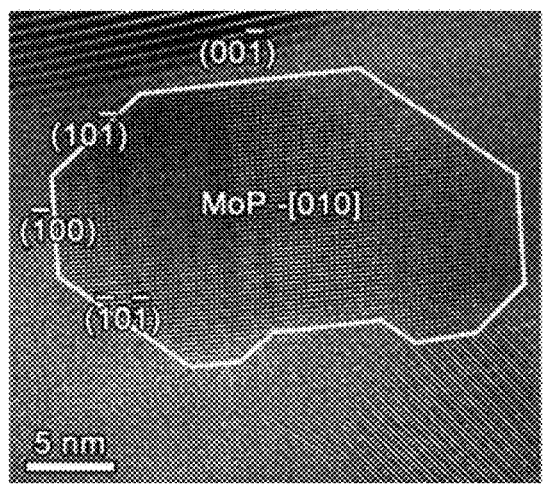
FIG. 16 is an HRTEM image of a MoP nanoparticle along the [010] zone axis.

FIG. 15A is an HRTEM image of a MoP$_2$ nanoparticle; the enlarged boxed area shows the detailed structure of the (1-10). Different surface facets were identified by solid-colored lines. FIG. 15B is a FFT image of the MoP$_2$ nanoparticle. FIG. 15C shows the simulated crystal structure along the [110] zone axis. FIGS. 15D and 15E, respectively show P atom distribution and Mo atom distribution along the [110] zone axis. FIG. 16 is an HRTEM image of a MoP nanoparticle along the [010] zone axis; various surface facets were identified by white lines.

Figure 17A:
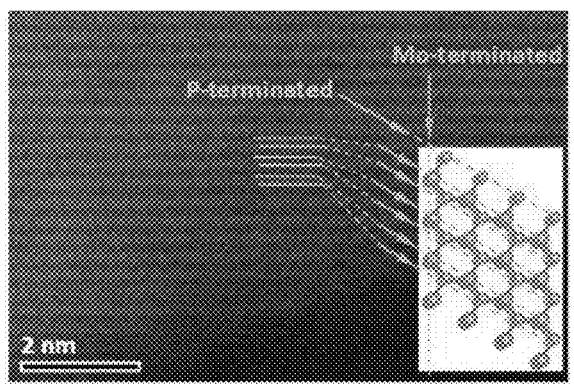
FIGS. 17A and 17B are high-angle annular dark-field scanning TEM (HAADF-STEM) images of MoP700 showing the distribution of Mo and P in selected area of MoP (17A) and MoP$_2$ (17B) areas.
Figure 17B:
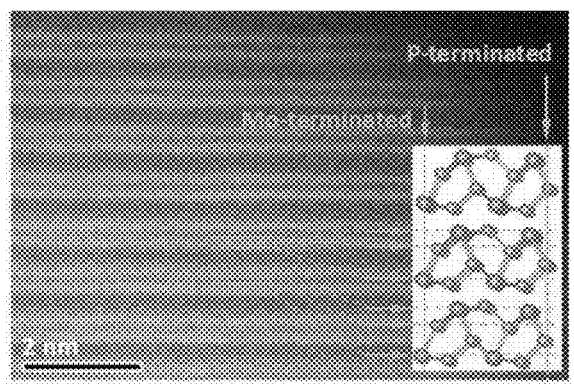

High-angle annular dark-field scanning TEM (HAADF-STEM) images of MoP700 showed the distribution of Mo and P in selected area of MoP (FIG. 17A) and MoP$_2$ (FIG. 17B) areas with both exhibiting Mo-terminated surfaces. FIG. 17A presents the HAADF-STEM image of selected area of MoP oriented along the [001] direction in which the Mo and P atoms are separated in two different columns. Because the contrast approximately scales with $Z^{1.7}$, the brighter columns correspond to Mo atoms and the lighter ones correspond to P atoms. The bright edges of MoP phase indicate that the surface atoms can be identified as Mo; that is, MoP possesses Mo-terminated surfaces. The HAADF-STEM image (FIG. 17B) of selected areas of MoP$_2$ phase exhibited a zigzagging layered structure and the Mo and P atoms are separated in three different columns. The brighter columns correspond to Mo atoms and the interbedded lighter column is P atoms. The results suggest that the outermost atomic layers of MoP and MoP$_2$ are Mo-terminated, as depicted in the insets of FIGS. 17A and 17B, respectively.

Figure 18A:
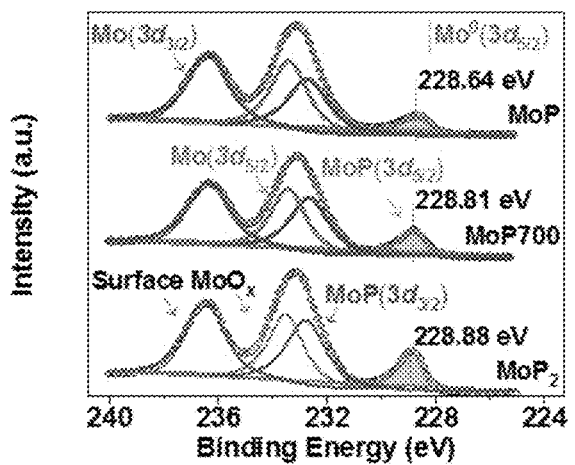
FIGS. 18A and 18B are high-resolution Mo 3d (18A) and P 2p (18B) XPS spectra for MoP700, MoP$_2$, and MoP.
Figure 18B:
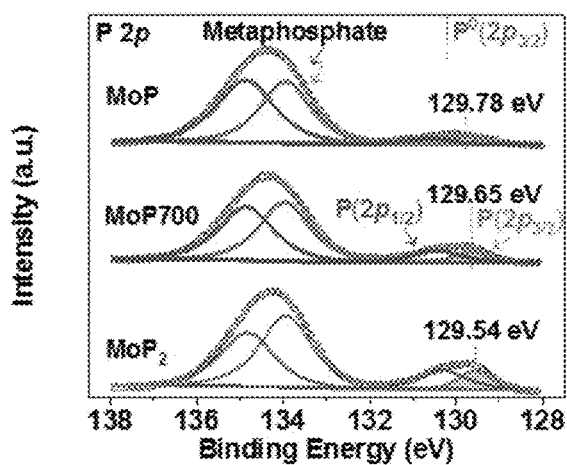

The surface chemistry of MoP700 was investigated by X-ray photoelectron spectroscopy (XPS). The Mo 3d region of MoP700 shows binding energies of 232.63 and 228.81 eV indicative of Mo$^{\delta+}$ (0<δ≤4) species generally assigned to Mo in MoP$_x$, and the rest of the Mo doublets at 236.35 eV and 233.39 eV can be attributed to high oxidation state of Mo (e.g., MoO$_3$, MoO$_2$) (FIG. 18A). The P 2p spectrum of MoP700 exhibits two main peak regions (FIG. 18B), with one centered at binding energy of 130.45 eV and 129.65 eV, which can be assigned to P bonded to Mo in the form of a phosphide, and the other peaks at 134.87 and 133.5 eV characteristic of metaphosphate. The existence of high valence Mo and P can be attributed to catalyst surface oxidation under ambient conditions as often observed for metal phosphides. Moreover, the charge values (δ) for Mo and P of catalysts are in the orders δ(Mo$^0$)<δ(MoP)<δ(MoP700)<δ(MoP$_2$) and δ(P$^0$)>δ(MoP)>δ(MoP700)>δ(MoP$_2$), respectively, revealing that Mo and P in MoP700 bear enhanced positive (δ$^+$) and negative (δ$^-$) charge, respectively. Those results point to the formation of strong "Mo$^{\delta+}$—P$^{\delta-}$" networks in MoP700, which could potentially mimics the catalytic behavior of "M$^{2+\delta}$O$^\delta$(OH)$_{2-\delta}$/Pt" or "Au—/Pt—S$_{ad}^{\delta-}$" systems for H$_2$O dissociation (Subbaraman et al., *Nat Mater* 2012, 11(6):550-7; Subbaraman et al., *Science* 2011, 334(6060):1256-60; Danilovic et al. *Angew Chem Int Edit* 2012, 51(50):12495-8), and then promotes the overall HER on the MoP$_2$/MoP heterostructured catalyst.

Example 2

Hydrogen Evolution Reaction (HER) Catalyzed by MoP700

Figure 19:
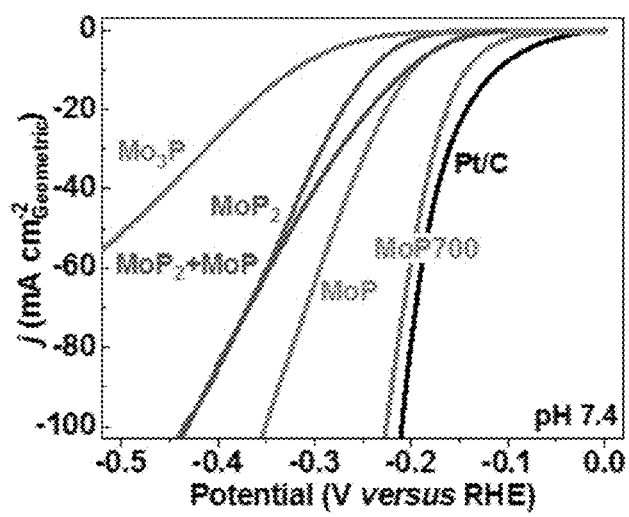
FIG. 19 shows polarization curves for the hydrogen evolution reaction (HER) on different catalysts (iR-corrected) in H$_2$-purged 1.0 M phosphate-buffered saline (pH 7.4); scan rate 5 mV·s$^{-1}$; electrode rotation speed: 1600 rpm.
Figure 20:
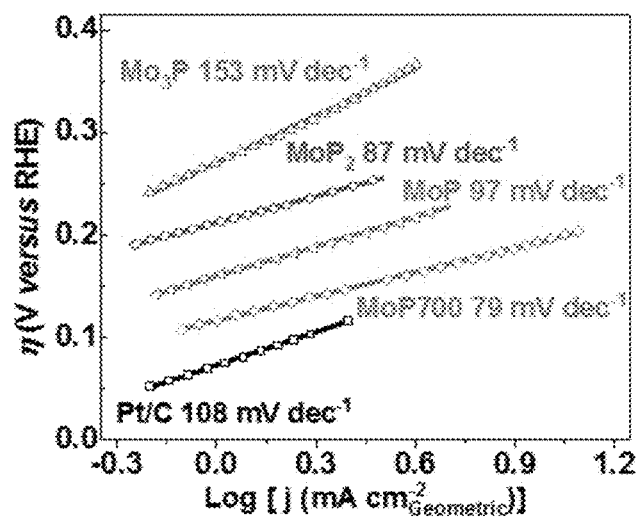
FIG. 20 shows Tafel plots derived from the polarization curves of FIG. 19.
Figure 21:
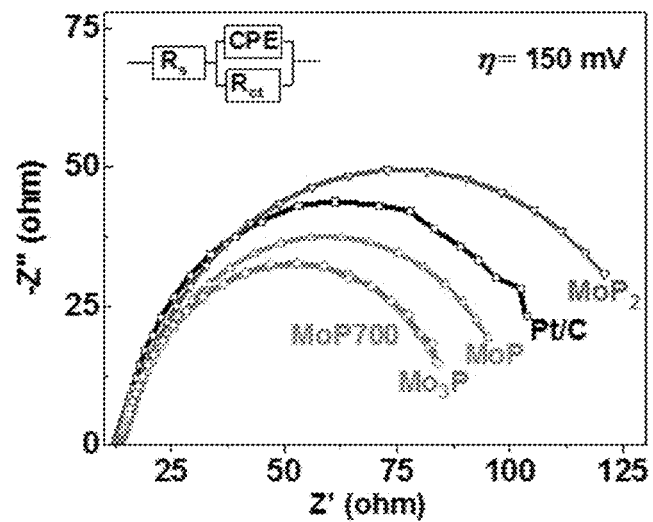
FIG. 21 shows Nyquist plots at the overpotential ($\eta$) of −150 mV; inset: equivalent circuit used for data analyses; R$_s$ and R$_{ct}$ represent the series and charge-transfer resistance, respectively.
Figure 22B:
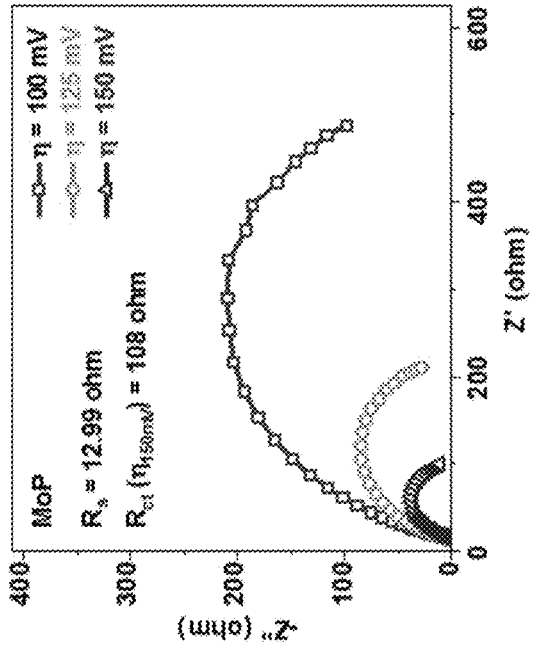
FIGS. 22A-22D are Nyquist plots of MoP700 (22A), MoP (22B), MoP$_2$ (22C), and Mo$_3$P (22D) at different overpotentials ($\eta$) from 100 to 150 mV.
Figure 22D:
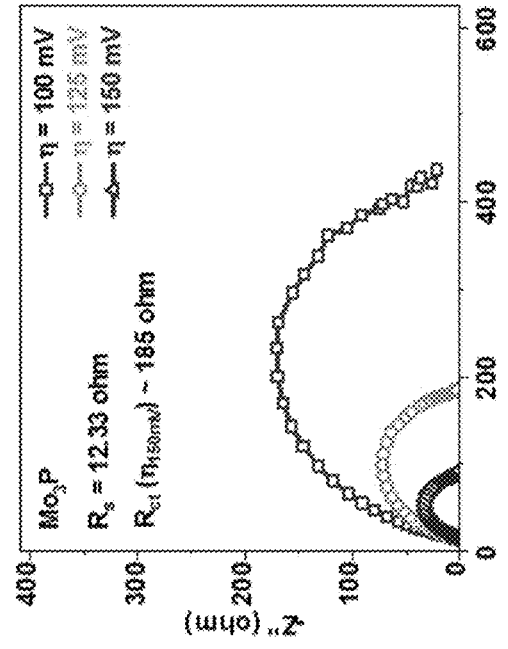
Figure 22A:
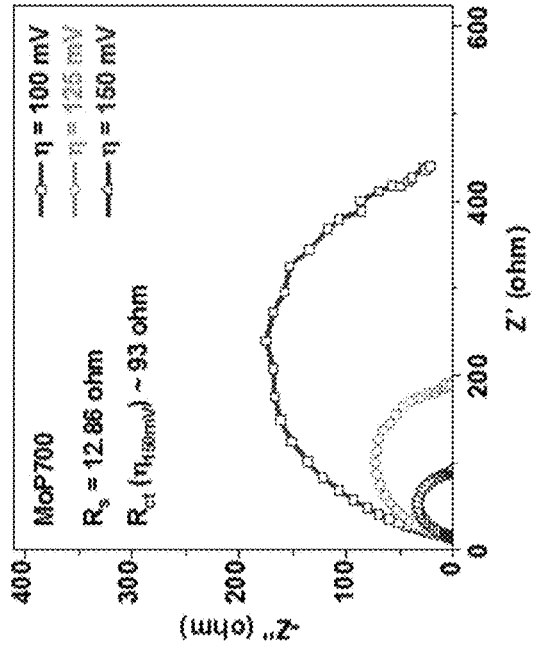
Figure 22C:
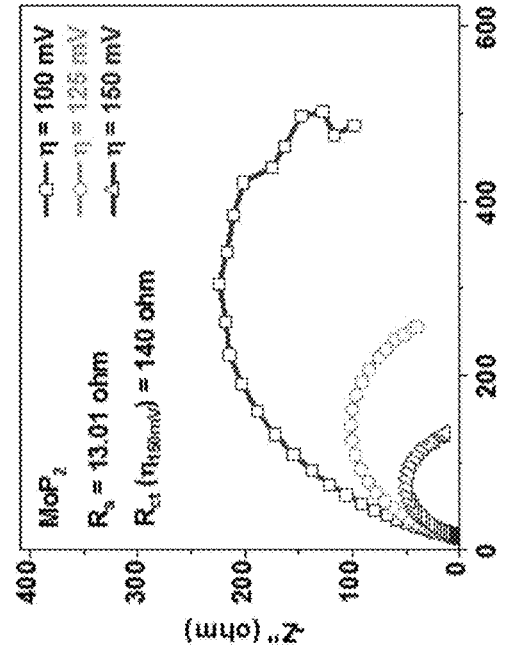

HER electrocatalytic activity of catalysts was first assessed in 1.0 M H$_2$-purged phosphate buffer solution (PBS, pH=7.4, ~25° C.) using a typical three-electrode cell. FIGS. 19 and 20, respectively, show the HER polarization curves and corresponding Tafel plots of MoP700 compared with those of $MoP_2$, MoP, $Mo_3P$ and Pt/C (20 wt % Pt/C, ETE-K). MoP700 exhibited a low onset overpotential ($\eta$) of 75 mV, slightly higher than Pt/C (45 mV) catalyst. The $\eta$ at current density (j) of 10 mA $cm^{-2}_{geometric}$ was 196 mV for MoP700, very close to 181 mV for Pt/C and significantly lower than 276, 327 and 490 mV for $MoP_2$, MoP and $Mo_3P$, respectively. As shown in Table 1, those $\eta$ values on MoP700 are smaller than most PGM-free HER catalysts reported to date, placing its performance among the best in neutral pH solutions. From the extrapolation of the liner region of a plot of $\eta$ versus log (j), Tafel slope values of 79, 97, 87, 153 and 108 mV $dec^{-1}$ were obtained for MoP700, $MoP_2$, MoP, $Mo_3P$ and Pt/C, respectively. The smallest Tafel slope of MoP700 indicates a two-electron transfer process following a Volmer-Tafel mechanism of $2H_{ads}$ adsorption and $H_2$ evolution occurring on the surface of MoP700, which also demonstrates favorable $H_2O$ dissociation and $H_{ads}$ recombination kinetics on MoP700.

TABLE 1

| Catalyst | Loading (mg · $cm^{-2}$) | Current density (j) (mA · $cm^{-2}$) | $\eta$ at the corresponding j (mV) | Reference |
| --- | --- | --- | --- | --- |
| MoP700 | 0.25 | 10 | 196 | N/A |
|  |  | 25 | 245 |  |
| MoP•Na/CC[a] | — | 10 | 187 | 1 |
| $MoS_2/Mo$[a] | — | 10 | 244 | 2 |
| MoP/CF[a] | — | 1 | 300 | 3 |
| MoB | — | 1.5 | 315 | 4 |
| $Mo_2C$ |  |  | 241 |  |
| Ni—S/FTO[a] | — | 10 | 330 | 5 |
| $NiS_2$•NA/CC | 4.1 ($NiS_2$) | 10 | 243 | 6 |
| MW—CoS | 0.283 | 10 | 275 | 7 |

[a]Catalytic materials directly grown or attached on current collectors
1. Pu et al., *Appl Catal B Environ* 2016, 196:193-8.
2. Pu et al., *Electrochim Acta* 2015, 168:133-8.
3. Cui et al., *Appl Catal B Environ* 2015, 164:144-50.
4. Vrubel et al., *Angew Chem Int Edit.* 2012, 51 (51):12703-6.
5. Jiang et al., *J Mater Chem A* 2014, 2(45):19407-14.
6. Tang et al., *Electrochim Acta* 2015, 153:508-14.
7. You et al., *Chem Commun* 2015, 51 (20:4252-5.

Electrochemical impedance spectroscopy (EIS) measurement was used to study the charge transfer on the catalysts under the HER conditions. The charge transfer resistance ($R_{ct}$) tells the kinetics of electrocatalysis on different electrodes, and a lower $R_{ct}$ value corresponds to a faster reaction rate. It was found that the $R_{ct}$ values of the electrodes show similar tendency to that previously observed in HER tests, with MoP700 exhibiting the smallest $R_{ct\ (\eta=150\ mV)}$ of 93 ohm (FIGS. 21, 22A-22D). This result indicates that the fast charge transfer is one of the key factors contributing to the superior neutral pH HER kinetics of the MoP700 electrode. All electrodes showed small and similar series resistance ($R_s$), suggesting that the experimental setup was consistent. The slight variation of $R_s$ in different electrodes can be attributed to the differences in electrode resistance. Basically, transition metal phosphides (e.g., MoP, $Ni_2P$, and $Co_2P$) have physical properties similar to those of ordinary metallic compounds like the carbides, nitrides, and borides. They combine the properties of metals and ceramics, and therefore exhibit metal-like properties and high electrical conductivity.

The stability is also important for electrocatalysts in an energy conversion system. The HER stability of MoP700 was investigated using a dynamic potential protocol by scanning electrode potential between −0.4 and 0.2 V (versus RHE) for 4,000 cycles at scan rate of 50 $mV·s^{-1}$. This type of accelerated stability test (AST) is developed to represents the cycling expected for real electrolysis devices. Continuous gas bubbling was observed on MoP700 electrode throughout the test. As shown in FIG. 23, the $\eta$ of MoP700 electrode at 10 $mA·cm^{-2}_{geometric}$ increased only by ~10 mV after the stability cycling, demonstrating a high stability of MoP700.

MoP700 also showed high and stable catalytic HER activity in in a three-electrode setup as described above using natural seawater (pH 7.8, salinity 33.8 psu) (FIG. 24). The outstanding HER performance of MoP700 shows a great potential for real application in $H_2$ production in neutral pH solution systems.

Example 3

Microbial Electrolysis Cell with MoP700 Catalyst

A microbial electrolysis cell (MEC) was constructed and inoculated as described in General Methods above. The MEC was operated at a pressure of 2 atm ($2\times10^5$ Pa). An initial evaluation in 200 mM phosphate buffer (pH 7.0) with 75 mM sodium acetate was performed. The cathode was 1.0 $cm^2$ catalyst-loaded carbon cloth with 0.5 $mg·cm^{-2}$ catalyst-MoP700 or Pt/C (145 $A·cm^2$). The anode was 10 $cm^2$ carbon cloth with enriched electrochemically active bacteria. Voltage was 1.0 V.

Figure 25:
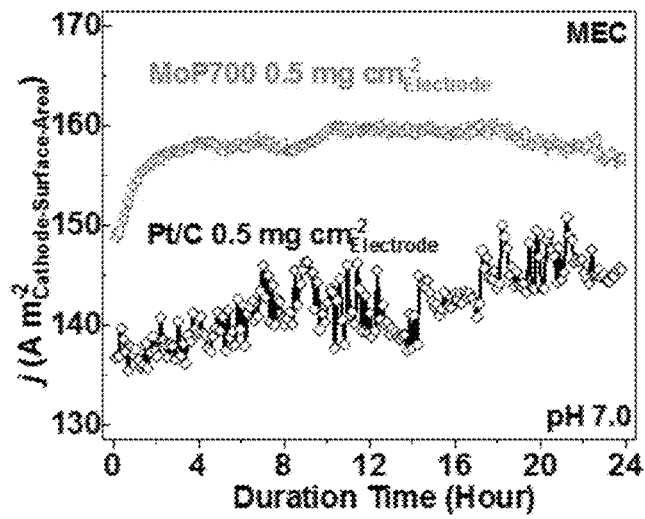
FIG. 25 is a graph showing current generation for Pt/C and MoP700 cathodes at an electrode loading of 0.5 mg·cm$^2$ in 200 mM phosphate buffer (pH 7.0) with 75 mM sodium acetate

As shown in FIG. 25, at the same catalyst loading, the MEC with MoP700 generated an average current density of 157 A $M^{-2}_{Cathode-Surface-Area}$, which was higher than that with Pt/C catalyst (145 A $m^{-2}_{Cathode-Surface-Area}$). The high current density achieved demonstrated that the cathode with MoP700 is capable of generating $H_2$ ~5 times faster than previously reported MECs (Table 2). The MEC with MoP700 also showed high catalytic stability during the MEC operation.

TABLE 2

| Optimal current density in MEC based on projected cathode surface (A · $m^{-2}$) | Catalyst type | Loading (mg · $cm^{-2}$) | Reference |
| --- | --- | --- | --- |
| 157 | MoP700 | 0.5 | N/A |
| 145 | Pt | 0.5 | N/A |
| 30 | electroformed Ni mesh | N/A | 1 |
| 14 | $MoS_2$ | 2.5 | 2 |
| 19 | stainless steel fiber felt | N/A | 3 |
| 18 | $Mg(OH)_2$/graphene | 1.5 | 4 |

1. Kadier et al., *Chem Commun* 2015, 51 (20 4252-5.
2. Tokash et al., *Int J Hydrogen Energ* 2011, 36(16):9439-45.
3. Su et al., *J Power Sources* 2016, 301:29-34.
4. Dai et al., *Fuel* 2016, 174:251-6.

Example 4

Catalytic Activity of MoP700

It was hypothesized that the excellent HER catalytic performance of the MoP700 catalyst is the direct outcome of its heterojunction-like $MoP_2$/MoP structure imparted by the unique chemical synthesis method. To prove this hypothesis, the intrinsic activity of catalysts was specifically compared by normalizing the measured current densities to their electrochemical active surface area (ECSA). FIGS. 26A-

26D show cyclic voltammograms (CV) curves of MoP700 (26A), MoP$_2$ (26B), MoP (26C) and Mo$_3$P (26D) in the potential region of 0.10-0.30 V (versus RHE) at various scan rates (20-100 mV s$^{-1}$).

The measured capacitive currents were used to determine the specific capacitance ($C_{dl}$) of electrodes ($\Delta J=\frac{1}{2}(J_a-J_c)$ at 0.20 V against the scan rate). The $C_{dl}$ was converted into an electrochemical surface area ($A_{ECSA}$) using the $C_{dl}$ value for a flat standard with 1 cm$^2$ of real surface area. The $C_{dl}$ for a flat surface is generally found to be in the range of 20-60 µF cm$^{-2}$. In this work, 40 µF cm$^{-2}$ was assumed, which is a general practice in literature (Kibsgaard et al., *Energ Environ Sci* 2015, 8(10):3022-9; Kibsgaard et al., *Angew Chem Int Edit* 2014, 53(52):14433-7). FIG. 27 shows the calibration of Ag/AgCl (3.0M KCl) reference electrode with respect to reversible hydrogen potential using reversible hydrogen electrode (RHE) in H$_2$-saturated 0.5 M H$_2$SO$_4$. The calibration resulted in a shift of −0.255 V vs the RHE; thus, $E_{(RHE)}$=0.059 pH+0.255V. FIG. 28 shows the measured $C_{dl}$ (FIGS. 26A-26D) plotted as a function of scan rate. The $A_{ECSA}$ of MoP$_x$ and Pt catalysts (0.25 mg cm$^{-2}$) on electrodes was calculated using the following formula (Kibsgaard et al., *Energ Environ Sci* 2015, 8(10):3022-9; Kibsgaard et al., *Angew Chem Int Edit* 2014, 53(52):14433-7):

$$A_{ECSA}^{Catalyst} = \frac{C_{dl}}{40uF\ cm^{-2}\ per\ cm_{ECSA}^2}$$

$$A_{ECSA}^{Pt} = \frac{79\ m^2g^{-1}}{0.2*0.25\ mgcm^{-2}*0.19625\ cm_{Electrode}^2}$$

The calculated $A_{ECSA}$ for the catalysts is shown in FIG. 29. FIG. 30 shows the measured HER polarization curves normalized to $A_{ECSA}$.

MoP700 exhibited a η of 201 mV at j of 0.3 mA cm$^{-2}_{ESCA}$, which outperformed MoP$_2$, MoP and Mo$_3$P by 115, 89 and 261 mV. These results show that MoP700 is a highly active neutral pH HER catalyst. Comparing the HER activity of MoP700 and physical mixed MoP$_2$/MoP demonstrated that MoP700 is far better than the mixture (FIG. 19). Those results suggested that the HER catalytic reactivity is facilitated by a synergistic effect between Mo P$_2$ and MoP.

Figure 31:
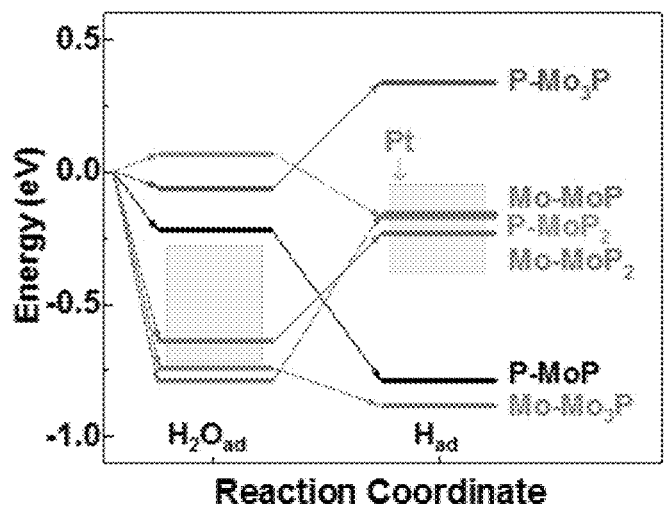
FIG. 31 shows the calculated adsorption binding energy ($\Delta E_b$) of H$_2$O and H adsorption on MoP$_2$, MoP and Mo$_3$P, Mo/P-terminated surfaces.
Figure 32:
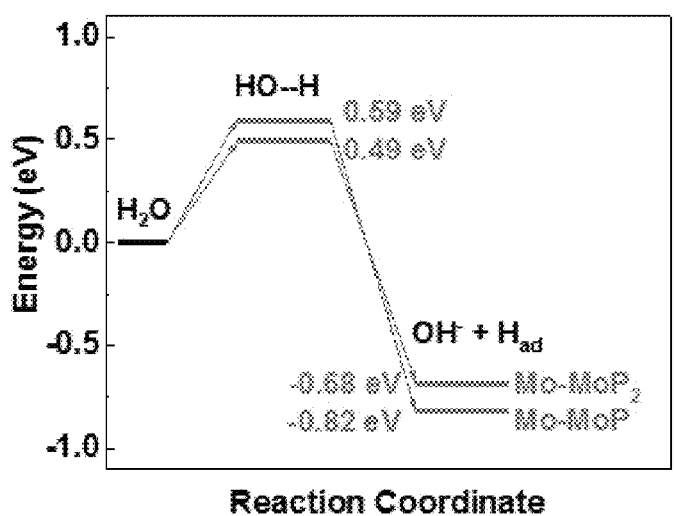
FIG. 32 shows the calculated kinetic reaction energy barriers ($\Delta E_a$) for H$_2$O dissociation on Mo—MoP and Mo—MoP$_2$ surfaces.

To understand the origin of the high activity of MoP700, density functional theory (DFT) calculations were performed. The binding strength ($\Delta E_b$) of H$_2$O and H to both Mo- and P-terminated MoP$_2$, MoP and Mo$_3$P surfaces was first calculated. Neutral pH HER involves H$_2$O chemisorption/activation and H recombination on the surface of catalyst; so, a strong bonding of H$_2$O and weak bonding of H to surface is desired. The calculations showed that only Mo—MoP$_2$ surface has superior H$_2$O chemisorption property and only Mo—MoP$_2$ and Mo—MoP surfaces show preferential binding for H (FIG. 31), similar to the reported trend for Pt catalysts (Fajin et al., *J Phys Chem A* 2014, 118(31):5832-40; Bazhenov et al., *J Phys Chem C* 2017 (121(8):5832-40; Kolb et al., *J Chem Phys* 2014, 140(13); Tan et al., ACS Catal 2015, 5(4):2376-83), indicating those two surfaces are the active surfaces for the neutral pH HER, which agrees well with the observed structure of MoP700 with Mo-terminated surfaces. The kinetic reaction barrier ($\Delta E_a$) for the dissociation of H$_2$O on Mo—MoP$_2$ and Mo—MoP surfaces was then calculated. The $\Delta E_a$ for the transition state and final state of H$_2$O decomposition on Mo—MoP$_2$ surface were determined to be lower than that on Mo—MoP surface (FIG. 32), suggesting a superior H$_2$O dissociation capability of Mo—MoP$_2$ surface. Meanwhile, on Mo—MoP surface, the $\Delta E_b$ for H was calculated to be lower than on Mo—MoP$_2$ surface. This suggests that the H$_{ad}$ produced on Mo—MoP$_2$ sites could be "delivered" to the nearby Mo—MoP sites to form H—H bond more effectively if both Mo—MoP$_2$ and Mo—MoP$_2$ are stay closely together in the catalyst. In MoP700, the MoP$_2$—MoP synergy not only facilitates the H$_2$O chemisorption/dissociation, but also promotes the H—H bond formation of two adjacent H$_{ads}$ that, finally, recombine into molecular H$_2$. All of these synergistic effects contribute to the enhanced neutral pH HER catalytic activity of MoP700.

Figure 33:
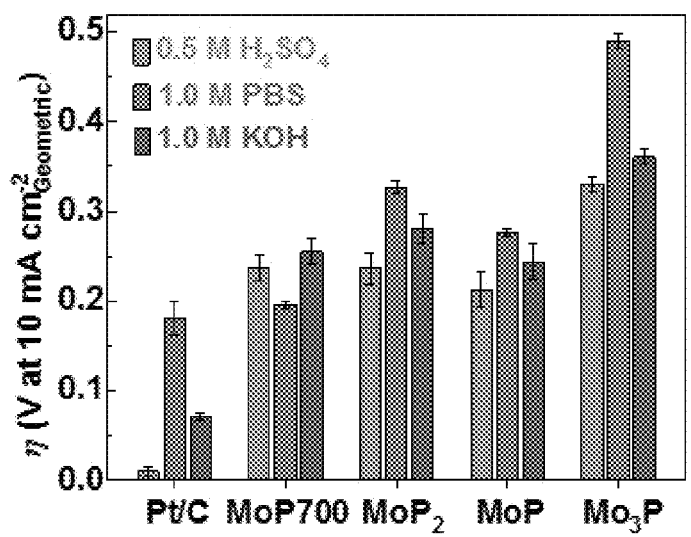
FIG. 33 is a bar graph comparing HER activity in acidic, neutral and basic solutions for MoP700, MoP$_2$, MoP, Mo$_3$P and Pt/C; error bars are the standard deviation of at least five sets of experimental repeats.

Additional catalytic studies were conducted to get further insights into the origin of the high HER activity of MoP700 in PBS. FIG. 33 compares the HER activities (expressed as η values at j of 10 mA cm$^{-2}_{Geometric}$) of MoP700, MoP$_2$, MoP, Mo$_3$P and Pt/C catalysts in acidic, neutral and basic solutions. For the MoP$_2$, MoP and Mo$_3$P catalysts, the HER catalytic activity increased in the order acidic>basic>neutral, consistent with the observed trend for Pt/C. However, the HER activity trend for MoP700, neutral>acidic>basic, was inverse to that observed on the other electrodes, indicating that the HER on MoP700 is controlled by the reactivity of the MoP$_2$/MoP composite surface.

Without wishing to be bound by any particular theory, it is hypothesized that the neutral pH HER mechanism on MoP700 surface is as shown in FIG. 3. Previous calculation of the P terminated surface on MoP implies that the binding of H$^+$ on P is unfavorable when the H$^+$ concentration is high (Xiao et al., *J of Catalysis* 2012, 287:161-9. The result is that P could 'poison' the active sites for H$_{ad}$ formation/recombination. In basic solution, because H$_2$O dissociation is kinetically facile on MoP700 while the HER activity is neutral<basic, desorption of OH$_{ad}$ species to refresh the catalysts' surface might be the key step for HER. That is, the OH$^-$ species from the electrolyte could either occupy or prevent the desorption of OH$_{ad}$ from the active sites for further H$_2$O adsorption/dissociation on MoP700 surface, causing inefficient release of OH$_{ad}$ and then deactivating the catalyst. The roughly equivalent HER activity on MoP700 in acidic and basic electrolytes might be related to the similar blocking effect of excess H$^+$ or OH$^-$ on the performance of MoP700 in HER. At this point, keeping in mind that HER of MoP700 in neutral solution is almost independent of H$^+$ and OH$^-$ and the HER activity is MoP700>MoP>MoP$_2$, it is believed that the surface MoP$_2$/MoP enabled fast H$_2$O dissociation step is the key for the high catalytic activity.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A catalyst, comprising:
   regions of crystalline MoP; and
   regions of crystalline MoP$_2$, the catalyst having a molar ratio of MoP:MoP$_2$ within a range of 5:95 to 95:5,
   wherein the catalyst is a composite of MoP and MoP$_2$, and the regions of crystalline MoP and regions of crystalline MoP$_2$ have Mo-terminated surfaces.

2. The catalyst of claim 1, wherein the composite is a nanocomposite comprising nanoparticles having an average largest dimension within a range of 5-50 nm.

3. The catalyst of claim 1, wherein:
the MoP regions comprise (101) planes and the $MoP_2$ regions comprise (020) planes.

4. A method of making a catalyst, comprising:
combining (i) $M^+_n[PMo_{12}O_{40}]^{n-}$ where $3 \leq n \leq 27$ and M is a +1 cation and (ii) $MH_2PO_2$ in a $M^+_n[PMo_{12}O_{40}]^{n-}/MH_2PO_2$ mass ratio within a range of 1:4 to 1:7 to provide a mixture;
heating the mixture in an inert atmosphere at a first temperature $T_1$ within a range of 240° C. to 300° C. for a first period of time to form $MoP_x$ where $1<x<2$; and
subsequently heating the $MoP_x$ in the inert atmosphere at a second temperature $T_2$ within a range of 675° C. to 725° C. for a second period of time to form a catalyst comprising MoP and $MoP_2$, the catalyst having a molar ratio of MoP:$MoP_2$ within a range of 5:95 to 95:5,
wherein the catalyst is a composite of MoP and $MoP_2$.

5. The method of claim 4, wherein the first period of time is at least one hour.

6. The method of claim 4, wherein the second period of time is at least four hours.

7. The method of claim 4, wherein the inert atmosphere comprises argon, nitrogen, helium, or any combination thereof.

8. The method of claim 4, further comprising preparing the $M^+_n[PMo_{12}O_{40}]^{n-}$ by:

preparing an aqueous solution comprising a phosphomolybdate (POM);
adding a reducing agent to the aqueous solution with stirring;
continuing to stir for an effective period of time to reduce POM and form a solution comprising nanoclusters of $M^+_n[PMo_{12}O_{40}]^{n-}$; and
drying the solution comprising the nanoclusters to obtain $M^+_n[PMo_{12}O_{40}]^{n-}$.

9. The method of claim 8, wherein the reducing agent is $NaBH_4$ and $M^+_n[PMo_{12}O_{40}]^{n-}$ is $Na^+_n[PMo_{12}O_{40}]^{n-}$.

10. The method of claim 9, wherein the effective period of time is at least one hour.

11. The method of claim 8, further comprising preparing the POM by:
preparing an aqueous solution comprising a molybdate and $H_3PO_4$ in a molar ratio$\leq$1:0.58 with stirring;
adding 10-15 mol $HNO_3$ per mol of the molybdate dropwise to the aqueous solution with stirring;
incubating the aqueous solution at a temperature within a range of from 60° C. to 100° C. for at least two hours, thereby producing a solution comprising POM; and
recovering POM from the solution comprising POM.

12. A product made by the method of claim 4.

13. The method of claim 4, wherein M is Na, K, or $NH_4$.

* * * * *